United States Patent
Al Rawi et al.

(10) Patent No.: US 11,082,088 B2
(45) Date of Patent: *Aug. 3, 2021

(54) METHOD AND APPARATUS FOR TRANSMITTING SIGNALS OVER WIRE CONNECTIONS

(71) Applicant: BRITISH TELECOMMUNICATIONS PUBLIC LIMITED COMPANY, London (GB)

(72) Inventors: Anas Al Rawi, London (GB); Ian Horsley, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/497,557

(22) PCT Filed: Mar. 28, 2018

(86) PCT No.: PCT/EP2018/058027
§ 371 (c)(1),
(2) Date: Sep. 25, 2019

(87) PCT Pub. No.: WO2018/178209
PCT Pub. Date: Oct. 4, 2018

(65) Prior Publication Data
US 2021/0105042 A1    Apr. 8, 2021

(30) Foreign Application Priority Data
Mar. 31, 2017  (EP) .................................. 17164439

(51) Int. Cl.
*H04B 3/32* (2006.01)
*H04B 3/487* (2015.01)
*H04B 1/40* (2015.01)

(52) U.S. Cl.
CPC ................. *H04B 3/32* (2013.01); *H04B 1/40* (2013.01); *H04B 3/487* (2015.01)

(58) Field of Classification Search
CPC ... H04B 1/38; H04B 1/40; H04B 3/20; H04B 3/32; H04B 3/487; H04B 3/50; H04B 3/54; H04B 3/542
(Continued)

(56) References Cited

U.S. PATENT DOCUMENTS 6,507,608 B1    1/2003  Norrell
6,947,441 B1    9/2005  Milbrandt
(Continued)

FOREIGN PATENT DOCUMENTS

CN    1311565 A    9/2001
CN    1471791 A    1/2004
(Continued)

OTHER PUBLICATIONS

Office Action dated Jun. 5, 2020 issued in U.S. Appl. No. 16/497,599 (16 pgs.).
(Continued)

*Primary Examiner* — Young T. Tse
(74) *Attorney, Agent, or Firm* — Nixon & Vanderhye P.C.

(57) ABSTRACT

A method and apparatus of transmitting data from a transmitter device to one or more receiver devices, each of the one or more receiver devices being connected to the transmitter device via a respective wire connection, the transmitter device being operable to transmit signals onto the wire connections over one or more different channels, the method comprising: iteratively performing steps (i) to (iii) until one or more criteria are satisfied, thereby determining current transmission powers for transmitting data, wherein: step (i) comprises determining values of a first function depending on one or more channel properties; step (ii) comprises, using
(Continued)

the determined value of the first function, determining transmission powers for transmitting data; and step (iii) comprises determining whether or not the determined transmission powers satisfy one or more criteria; and thereafter transmitting data at the current transmission powers.

22 Claims, 5 Drawing Sheets

(58) Field of Classification Search
USPC .............. 375/219, 220, 222, 257, 260, 261; 370/282, 286, 289, 290; 379/406.01, 379/406.05, 406.06, 406.08, 399.01, 379/399.02; 455/500, 501, 63.1, 88
See application file for complete search history.

(56) References Cited

U.S. PATENT DOCUMENTS

| | | | |
|---|---|---|---|
| 6,961,303 | B1 | 11/2005 | Binder |
| 7,072,449 | B2 | 7/2006 | Tomilson |
| 7,388,945 | B2 | 6/2008 | Pythoud |
| 7,561,625 | B1 | 7/2009 | Searles et al. |
| 9,270,333 | B2 | 2/2016 | Lu |
| 10,069,617 | B2 | 9/2018 | Al Rawi et al. |
| 10,097,236 | B2 | 10/2018 | Al Rawi et al. |
| 10,193,594 | B2 | 1/2019 | Al Rawi |
| 10,819,498 | B2 | 10/2020 | Al Rawi |
| 2002/0118652 | A1* | 8/2002 | Ahmed ................. H04B 3/487 370/286 |
| 2004/0264559 | A1 | 12/2004 | Cendrillon |
| 2005/0259725 | A1* | 11/2005 | Cioffi ....................... H04B 3/32 375/222 |
| 2006/0268966 | A1 | 11/2006 | Cioffi et al. |
| 2006/0280237 | A1* | 12/2006 | Rhee ..................... H04L 5/0064 375/222 |
| 2007/0263711 | A1* | 11/2007 | Theodor Kramer ... H04B 3/487 375/222 |
| 2009/0268601 | A1* | 10/2009 | Fang ........................ H04B 3/32 370/201 |
| 2012/0140797 | A1 | 6/2012 | Malkin et al. |
| 2013/0208579 | A1 | 8/2013 | Strobel |
| 2014/0185701 | A1* | 7/2014 | Liang ....................... H04B 3/00 375/295 |
| 2014/0219074 | A1* | 8/2014 | Lu ..................... H04L 25/03343 370/201 |
| 2014/0241384 | A1 | 8/2014 | Du et al. |
| 2014/0269947 | A1 | 9/2014 | Schneider |
| 2014/0359389 | A1 | 12/2014 | Seastrom |
| 2015/0288417 | A1 | 10/2015 | Gomez |
| 2015/0327310 | A1 | 11/2015 | Miura |
| 2017/0111119 | A1 | 4/2017 | Yoo et al. |
| 2017/0244446 | A1* | 8/2017 | Alrawi ..................... H04B 3/32 |
| 2020/0021331 | A1 | 1/2020 | Al Rawi et al. |
| 2020/0028660 | A1 | 1/2020 | Al Rawi et al. |
| 2020/0350951 | A1* | 11/2020 | Stigant ..................... H04B 3/32 |

FOREIGN PATENT DOCUMENTS

| | | |
|---|---|---|
| CN | 1886904 | 12/2006 |
| CN | 101218776 A | 7/2008 |
| CN | 101523836 A | 9/2009 |
| CN | 101720529 A | 6/2010 |
| CN | 101978717 | 2/2011 |
| CN | 102355282 A | 2/2012 |
| CN | 102651656 A | 8/2012 |
| CN | 102820662 | 12/2012 |
| CN | 103891154 A | 6/2014 |
| CN | 104412703 A | 3/2015 |
| CN | 105556940 A | 5/2016 |
| CN | 105706392 A | 6/2016 |
| CN | 106059622 A | 10/2016 |
| CN | 106537794 A | 3/2017 |
| CN | 106537796 A | 3/2017 |
| EP | 1 492 261 A1 | 12/2004 |
| EP | 2 091 196 | 8/2009 |
| EP | 2 429 114 | 3/2012 |
| EP | 2 538 567 | 12/2012 |
| EP | 14 250 116.2 | 9/2014 |
| EP | 2922215 A1 | 9/2015 |
| EP | 3012979 A2 | 4/2016 |
| FR | 2 848 041 A1 | 6/2004 |
| WO | 2006/120510 | 11/2006 |
| WO | 2013/026479 | 2/2013 |
| WO | 2013/143604 | 10/2013 |
| WO | 2014/107857 A1 | 7/2014 |
| WO | 2016/045604 A1 | 3/2016 |
| WO | 2016/139254 A1 | 9/2016 |
| WO | 2017/045207 A1 | 3/2017 |

OTHER PUBLICATIONS

U.S. Appl. No. 16/497,576, filed Sep. 25, 2019 to Al Rawi et al. (48 pgs.).
U.S. Appl. No. 16/497,599, filed Sep. 25, 2019 to Al Rawi et al. (57 pgs.).
U.S. Appl. No. 16/497,539, filed Sep. 25, 2019 to Al Rawi et al. (52 pgs.).
U.S. Appl. No. 16/497,549, filed Sep. 25, 2019 to Al Rawi et al. (55 pgs.).
Office Action dated Jun. 23, 2020 issued in U.S. Appl. No. 16/497,549 (11 pgs.).
Office Action dated Feb. 2, 2021 issued in U.S. Appl. No. 16/497,576 (12 pages).
Lee et al., Efficient Resource Allocation for Multiclass Services in Multiuser OFDM Systems, IEICE, 11 pages, Feb. 2009.
Guenach et al., Power Optimization in Vectored and Non-Vectored G.fast Transmission, IEEE, 5 pages, 2014.
Huang et al., Fast Mitigation of Sudden Termination Changes in Wideband Wireline Systems, IEEE, 12 pages, Jun. 2016.
International Search Report dated Jul. 11, 2018, issued in PCT/EP2018/058500 (4 pages).
Written Opinion of the ISA dated Jul. 11, 2019, issued in PCT/EP2018/058500 (8 pages).
International Search Report dated May 7, 2018, issued in PCT/EP2018/057984 (3 pages).
Written Opinion of the ISA dated May 7, 2018, issued in PCT/EP2018/057984 (6 pages).
International Search Report dated May 7, 2018, issued in PCT/EP2018/057992 (3 pages).
Written Opinion of the ISA dated May 7, 2018, issued in PCT/EP2018/057992 (6 pages).
International Search Report dated Jul. 12, 2018, issued in PCT/EP2018/058499 (4 pages).
Written Opinion of the ISA dated Jul. 12, 2018, issued in PCT/EP2018/058499 (7 pages).
International Search Report dated May 30, 2018 issued in PCT/EP2018/058027 (3 pages).
Written Opinion of the ISA dated May 30, 2018, issued in PCT/EP2018/058027 (7 pages).
International Search Report dated Apr. 21, 2016, issued in PCT/EP2016/054167 (3 pages).
Written Opinion of the ISA dated Apr. 21, 2016, issued in PCT/EP2016/054167 (5 pages).
International Search Report dated May 7, 2018, issued in PCT/EP2018/057976 (4 pages).
Written Opinion of the ISA dated May 7, 2018, issued in PCT/EP2018/057976 (6 pages).
International Search Report for PCT/EP2016/054441, dated Apr. 21, 2016 (3 pages).
Written Opinion of the ISA for PCT/EP2016/054441, dated Apr. 21, 2016 (9 pages).
Combined Search and Examination Report dated Nov. 7, 2017, issued in GB 1708443.5 (3 pages).
Combined Search and Examination Report dated Nov. 8, 2017, issued in GB 1708449.2 (4 pages).

(56) References Cited

OTHER PUBLICATIONS

Combined Search and Examination Report dated Sep. 27, 2017, issued in GB 1705283.8 (2 pages).
Combined Search and Examination Report dated Sep. 28, 2017, issued in GB 1705285.3 (2 pages).
Combined Search and Examination Report dated Sep. 29, 2017, issued in GB 1705288.7 (5 pages).
Extended European Search dated Dec. 15, 2017, issued in EP 17173052.6 (10 pages).
Extended European Search dated Dec. 15, 2017, issued in EP 17173054.2 (11 pages).
Extended European Search dated Oct. 16, 2017, issued in EP 17164439.6 (8 pages).
Extended European Search dated Oct. 10, 2017, issued in EP 17164429.7 (8 pages).
Extended European Search dated Oct. 6, 2017, issued in EP 17164424.8 (8 pages).
Extended European Search dated Oct. 6, 2017, issued in EP 17164435.4 (9 pages).
Extended European Search dated Jun. 2, 2015, issued in EP 15275057.6 (10 pages).
Search Report for EP 15275058, dated Apr. 14, 2015 (4 pages).
Search Report for GB 1705286.1, dated Sep. 20, 2017 (1 page).
Office Action dated Apr. 15, 2019 issued in EP 16 707 747.8 (13 pages).
Search Report for EP 15275058.4, dated Apr. 22, 2015 (4 pages).
Mayevskiy, "Measuring crosstalk in differential signals", Nov. 1, 2004, EDN Network, 3 pages. (Year: 2004).
ITU-T Telecommunication Standardization Sector of ITU G.993.5 Series G: Transmission Systems and Media, Digital Systems and Networks, Digital sections and digital line system—Access networks Self-FEXT cancellation (vectoring) for use with VDSL2 transceivers Apr. 2010—80 pages.
Moraes, et al., "General Framework and Algorithm for Data Rate Maximization in DSL Networks", IEEE Transactions on Communications, vol. 62, No. 5, May 2014 (13 pages).
English translation of First Notification of Office Action dated Aug. 4, 2020 issued in CN Application No. 201680013379.7 (7 pgs.).
English translation of First Notification of Office Action dated Aug. 10, 2020 issued in CN Application No. 201680013357.0 (11 pgs.).
Office Action dated Aug. 5, 2020 issued in Chinese Application No. 201880022709.8 (9 pgs.—counterpart to U.S. Appl. No. 16/497,549).
Office Action dated Aug. 5, 2020 issued in Chinese Application No. 201880022812.2 (10 pgs.—counterpart to U.S. Appl. No. 16/497,599).
Office Action dated Aug. 5, 2020 issued in Chinese Application No. 201880022819.4 (8 pgs.—counterpart to U.S. Appl. No. 16/497,576).
Office Action dated Aug. 17, 2020 issued in Chinese Application No. 201880022813.7 (10 pgs.— counterpart to U.S. Appl. No. 16/497,557).
U.S. Office Action dated Feb. 9, 2021 issued in U.S. Appl. No. 16/497,539 (14 pgs.).
Office Action dated Feb. 1, 2021 issued in Chinese Application No. 201880022847.6 (9 pgs.) and translation (9 pgs.).

\* cited by examiner

METHOD AND APPARATUS FOR TRANSMITTING SIGNALS OVER WIRE CONNECTIONS

This application is the U.S. national phase of International Application No. PCT/EP2018/058027 filed 28 Mar. 2018, which designated the U.S. and claims priority to EP Patent Application No. 17164439.6 filed 31 Mar. 2017, the entire contents of each of which are hereby incorporated by reference.

FIELD OF INVENTION

The present invention relates to a method and apparatus for transmitting data from a transmitter device to a plurality of receiver devices, and in particular to a method and apparatus for transmitting and receiving data signals over pairs of wires. Such methods include all of the various Digital Subscriber Line (DSL) methods as specified in various International Telecommunications Union (ITU) standards and as being further developed in the ITU at present. Typically each such pair of wires comprises a twisted metallic pair (usually copper) as commonly found within telephone access networks throughout the world.

BACKGROUND

DSL technology takes advantage of the fact that although a legacy twisted metallic pair (which was originally installed to provide merely a Plain Old Telephone Services (POTS) telephony connection) might only have been intended to carry signals using differential mode at frequencies of up to a few Kilohertz, in fact such a line can often reliably carry signals at much greater frequencies. Moreover, the shorter the line, the greater is the range of frequencies over which signals can be reliably transmitted (especially with the use of technologies such as Discrete Multi-Tone (DMT), etc.). Thus as access networks have evolved, telecommunications network providers have expanded their fibre optic infrastructure outwards towards the edges of the access network, making the lengths of the final portion of each connection to an end user subscriber (which is still typically provided by a metallic twisted pair) shorter and shorter, giving rise to correspondingly greater and greater bandwidth potential over the increasingly short twisted metallic pair connections without having to bear the expense of installing new optic fibre connections to each subscriber.

In the separate field of wireless communication, as the frequency response of a given wireless channel varies aggressively, flat transmitting power spectral density (PSD) tends to become increasingly inefficient, for example since power density per Hertz does not fully compensate for associated channel loss at a given frequency. Subsequently, this degrades the efficiencies of system energy and the channel capacity. As a solution, so-called "water-filling/pouring" was first suggested by Claude Shannon in 1949. Since then, there have been a lot studies trying to derive the optimal solutions for various wireless channels.

SUMMARY OF INVENTION

The present inventors have realised that, as the bandwidth of DSL systems keep expanding, the encountered loss will tend to become steeper than earlier DSL generations. Thus, flat PSD will tend to become extremely inefficient. This may be due, for example, to non-optimal power allocation to some frequencies. Aspects of the present invention provide a fast converging analytical water-filling algorithm that tend to overcome this problem.

The present inventors have further realised that, unlike slow/fast time varying wireless channels, Twisted Metallic Pair (TMP) channels tend to be semi-static. Thus, variability of the frequency response of TMP channels over time tends to be negligible. The present inventors have further realised that, however, with TMP channels the loss across the system bandwidth tends to be much steeper compared to wireless channels, and, as a result, aggressive signal shaping of the channel frequency response for TMP channels can be avoided. The present inventors have realised that this can be exploited to minimise the complexity of any water-filling solution.

In a first aspect, the present invention provides a method of transmitting data from a transmitter device to one or more receiver devices, each of the one or more receiver devices being connected to the transmitter device via a respective wire connection, the transmitter device being operable to transmit signals onto the wire connections over one or more different channels. The method comprises: iteratively performing steps (i) to (iii) until, at step (iii), it is determined that one or more criteria are satisfied, thereby determining, for each of the one or more different channels, a current respective transmission power for transmitting data over that channel, wherein: step (i) comprises determining, for each of the one or more different channels, a value of a first function, the first function being a function of one or more parameters selected from the group of parameters consisting of: a number of different tones for the one or more channels, a frequency spacing between adjacent tones, a maximum power for transmitting the data over the one or more different channels, and a channel gain of that channel; step (ii) comprises, using the determined value of the first function, determining, for each of the one or more different channels, a respective transmission power for transmitting data along that channel; and step (iii) comprises determining whether or not the one or more determined transmission powers satisfy one or more criteria; and, thereafter, for each of the one or more channels, transmitting, by the transmitter device, data over that channel to one or more of the receiver devices, the data being transmitted at the current transmission power determined for that channel. For second and subsequent iterations of steps (i) to (iii), the first function may be determined at step (i) by modifying a value of the first function of the preceding iteration.

An available spectrum for the transmission of the data over the one or more channels may comprise a plurality of tones. Steps (i) to (iii) may be iterated for each of the plurality of the tones, thereby to determine, for each of the one or more channels and for each of the plurality of tones, a current respective transmission power for transmitting data over that channel at that tone. The step of transmitting may comprise, for each of the one or more channels and for each of the plurality of tones, transmitting, by the transmitter device, data over that channel and at that tone to the one or more of the receiver devices, the data being transmitted at the current transmission power determined for that channel and that tone. The first function may additionally be a function of one or more parameters selected from the group of parameters consisting of: a total number of different tones, and frequency separation between tones. The first function may additionally be a function of a gain of the one or more channels, the gain of a channel being a ratio of a power coupling coefficient to a noise level on that channel.

The first function may be a Lagrange multiplier, the Lagrange multiplier being a term of a Lagrangian function, the Lagrangian function being dependent on a channel capacity of the one or more channels and one or more constraints.

The first function may be given by:

$$\Omega_{j,j} = \frac{M}{\ln 2 \left( \frac{P_T}{\Delta_f} + \sum_m \frac{1}{\gamma_{j,j}^m} \right)}$$

where: j is a channel index;
M is the number of different tones;
$\Delta_f$ is a frequency spacing between adjacent tones
$P_T$ is the maximum power for transmitting the data over the one or more different channels; and
$\gamma_{j,j}^m$ is a gain of the jth channel.

Step (ii) may comprises: using the determined value of the first function, determining a value of a second function, the second function being a function of a power mask for transmitting the data over the one or more different channels; and, using the determined value of the second function, determining, for each of the one or more different channels, a respective transmission power for transmitting data along that channel.

The step of, using the determined value of the second function, determining, for each of the one or more different channels, a respective transmission power for transmitting data along that channel may comprise: using the determined value of the second function, determining a value of a third function, the third function being a function of an upper bound for a channel capacity of the one or more channels; and, using the determined value of the third function, determining, for each of the one or more different channels, a respective transmission power for transmitting data along that channel.

The second function may be given by:

$$\eta_{j,j}^m = \frac{\gamma_{j,j}^m \left( 1 - \beta_{max_{j,j}}^m \right)}{(\ln 2)(1 + p_m \gamma_{j,j}^m)} - \Omega_{j,j}$$

The third function may be given by:

$$\beta_{max_{j,j}}^m = 1 - \frac{2^{b_{max}}(\ln 2)(\Omega_{j,j} + \eta_{j,j}^m)}{\gamma_{j,j}^m}$$

where: j is a channel index;
m is an index for the different tones;
$p_m$ is the power mask at tone m;

$\beta_{max_{j,j}}^m$ is set to an initial value for determining the second function at a first iteration of the steps (i) to (iii);
$\gamma_{j,j}^m$ is a gain of the jth channel at tone m;
$\Omega_{j,j}^m$ is the first function; and
$b_{max}$ is the upper bound for upper bound for the channel capacity of the one or more channels.

Step (ii) may comprise: using the determined value of the first function, determining, for each of the one or more different channels, an initial transmission power $s_{j,j}^m$ for that channel; for each of the one or more different channels, determining whether the determined initial transmission power $s_{j,j}^m$ for that channel satisfies the criterion:

$$\log_2(1+s_{j,j}^m \gamma_{j,j}^m) > \varepsilon_1$$

Where j is a channel index;
$\varepsilon_1$ is a numerical value; and
$\gamma_{j,j}^m$ is a gain of the jth channel; setting equal to zero each initial transmission power $s_{j,j}^m$ that does not satisfy the criterion $\log_2 (1+s_{j,j}^m \gamma_{j,j}^m) > \varepsilon_1$; and maintaining the value of each initial transmission power $s_{j,j}^m$ that does satisfy the criterion $\log_2 (1+s_{j,j}^m \gamma_{j,j}^m) > \varepsilon_1$. $\varepsilon_1$ may be zero.

The one or more criteria may comprise at least one criterion selected from the group of criteria consisting of: the criterion that: $\log_2 (1+s_{j,j}^m \gamma_{j,j}^m) \leq b_{max} - \varepsilon_2$, the criterion that $$\sum_{m=1}^{M} s_{j,j}^m = P_T - \varepsilon_3;$$

wherein: j is a channel index; $s_{j,j}^m$ denotes the one or more determined transmission powers; $\gamma_{j,j}^m$ is a gain of the jth channel; $b_{max}$ is the upper bound for the channel capacity of the one or more channels; $P_T$ is the maximum power for transmitting the data over the one or more different channels; and $\varepsilon_2$ and $\varepsilon_3$ are numerical values. $\varepsilon_2$ and/or $\varepsilon_3$ may be zero.

The one or more channels may comprise one or more channel selected from the group of channels consisting of: a direct channel, an indirect channel, a channel provided by a change over time of a potential difference between a pair of the wire connections, a phantom channel, a common mode channel.

In a further aspect, the present invention provides a transmitter device for transmitting data to one or more receiver devices, each of which is connected to the transmitter device via a respective wire connection, the transmitter device being operable to transmit signals onto the wire connections over one or more different channels. The transmitter device is configured to: iteratively perform steps (i) to (iii) until, at step (iii), it is determined that one or more criteria are satisfied, thereby to determine, for each of the one or more different channels, a current respective transmission power for transmitting data over that channel, wherein: step (i) comprises determining, for each of the one or more different channels, a value of a first function, the first function being a function of one or more parameters selected from the group of parameters consisting of: a number of different tones for the one or more channels, a frequency spacing between adjacent tones, a maximum power for transmitting the data over the one or more different channels, and a channel gain of that channel; step (ii) comprises, using the determined value of the first function, determining, for each of the one or more different channels, a respective transmission power for transmitting data along that channel; and step (iii) comprises determining whether or not the one or more determined transmission powers satisfy one or more criteria; and, thereafter, for each of the one or more channels, transmit, at the current transmission power determined for that channel, data over that channel to one or more of the receiver devices.

In a further aspect, the present invention provides a program or plurality of programs arranged such that when executed by a computer system or one or more processors it/they cause the computer system or the one or more processors to operate in accordance with the method of any of preceding aspect.

In a further aspect, the present invention provides a machine readable storage medium storing a program or at least one of the plurality of programs according to any preceding aspect.

BRIEF DESCRIPTION OF THE DRAWINGS

In order that the present invention may be better understood, embodiments thereof will now be described with reference to the accompanying drawings in which.

SPECIFIC DESCRIPTION OF EMBODIMENTS

Figure 1:
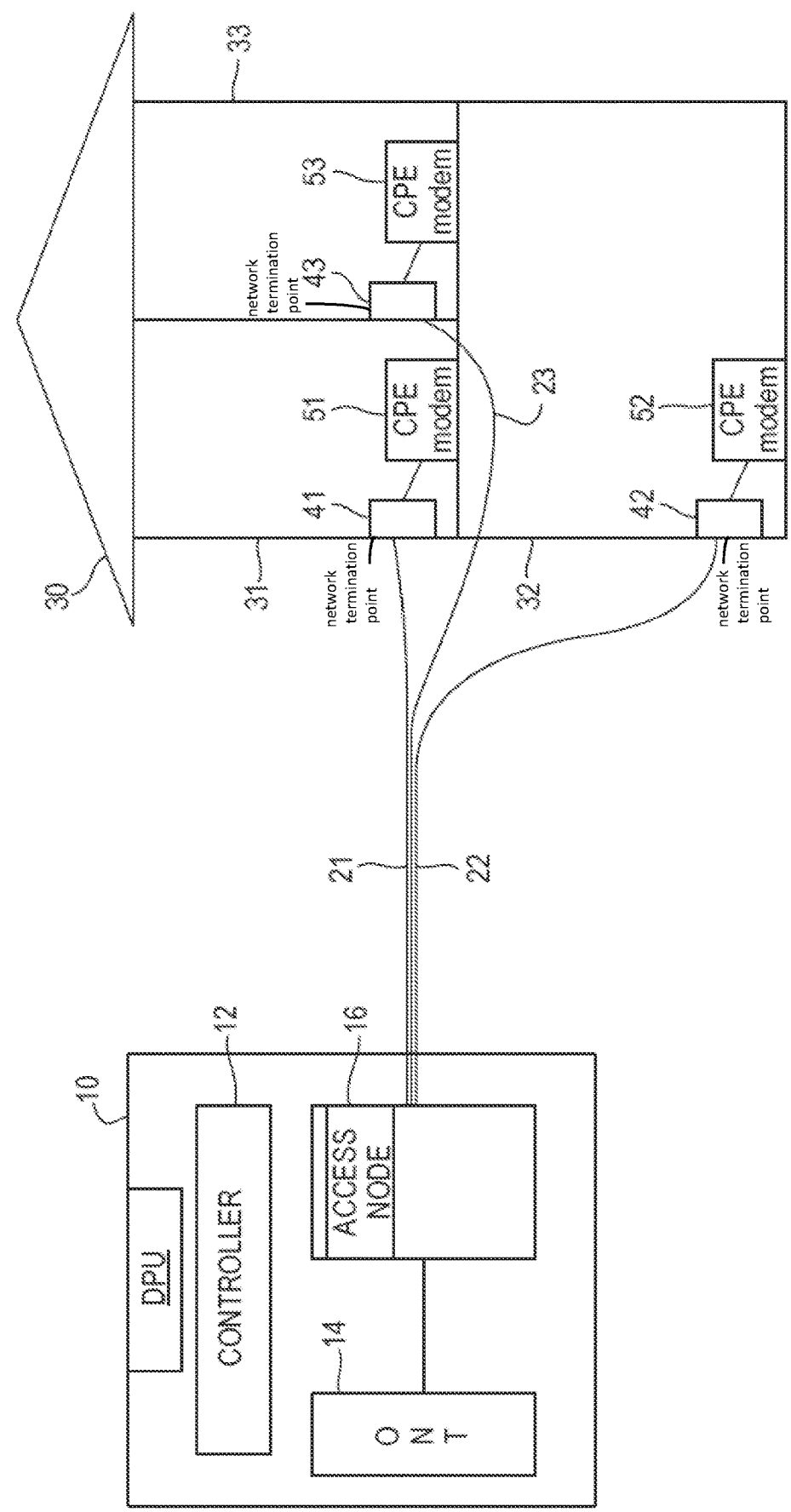
FIG. 1 is a schematic illustration (not to scale) of an example broadband deployment.

In the below description, reference will be made to modes of communication. Herein, the term "mode" is used to indicate the nature of the manner in which signals are transmitted between transmitter and receiver. In particular, as will be appreciated by persons skilled in the art, there are three principal such modes of communication: differential mode, phantom mode, and common mode. In all three of these modes the signal is transmitted (excited) and received (observed) as the (changing) potential difference (voltage differential) between two voltages (or equivalently between one "live" voltage and one "reference" voltage). In the differential mode the signal is transmitted/observed as the difference in potential between two wires (typically between two wires of a twisted metallic pair). In the phantom mode at least one of the voltages is the average voltage of a pair of wires (note that such average can vary without impacting on a signal carried in the differential mode across that same pair of wires—in this sense the phantom mode can be orthogonal to signals carried in the differential mode if carefully chosen); the term pure phantom mode may be used to specify that both voltages being compared with each other are average voltages, each average voltage being the average or common voltage of at least one pair of wires. Second and higher order phantom modes can also be obtained by using the average voltage of two or more average voltages as one of the voltages to be compared, etc. Finally, the common mode refers to the case where one of the voltages being compared is the "Earth" or ground reference voltage (or something substantially similar for telecommunications purposes). Naturally, it is possible for various mixed modes to also be used for carrying signals. For example, one reference voltage could be a common ground and the other could be the average between the voltages of two wires in a twisted metallic pair (to generate a mixed mode of phantom and common modes). However, in general, reference to a differential mode in this specification is used to refer to a pure differential mode, i.e. it does not include any phantom or common mode component so a mode comprising a comparison between the voltage on a single wire and the average voltage between the voltages of two other wires may be referred to as an impure phantom mode rather than a mixed phantom and differential mode, etc.

Phantom channels can be constructed from different combinations of TMPs. For instance, a first and a second TMP can together generate a single unique phantom channel which has a similar behaviour to that of each directly coupled differential mode channel formed across each pair in terms of channel directivity. However, phantom modes, as mentioned earlier, are due to the variation of the average voltages of the pairs. For more than two coupled pairs, the pairs may couple to each other in the phantom mode in various orthogonal and non-orthogonal manners, e.g. two distinct (but non-orthogonal) phantom mode channels may be exploited which share one common pair. Preferred embodiments of the invention select and construct only orthogonal phantom channels.

Reference is also made throughout the below description to direct and indirect coupling and direct and indirect channels. A direct channel is one in which the same physical medium and the same mode of transmission is used for both the transmission of the signal and for the reception of the signal. Thus a normal differential mode transmission across a single TMP from transmitter to receiver would constitute a direct (differential mode) channel between the transmitter and the receiver. By contrast, a channel in which the transmitter transmitted a signal onto a second TMP in differential mode but was received by a receiver from a first TMP in differential mode (the signal having "crosstalked" across from the second to the first pair) is an example of an indirect channel, as is a case in which a signal is transmitted by a transmitter in a phantom mode across the averages of the voltages of the wires in each of a first and second TMP and received (having "crosstalked/mode" converted) by a receiver connected to just the first TMP in differential mode.

Moreover, where there are multiple TMPs emanating from a single transmitter (e.g. an Access Node (AN) or Digital Subscriber Line Access Multiplexor (DSLAM), etc.) in such a way that multiple direct and indirect channels are formed between the transmitter and multiple receivers, the set of twisted metallic channel pairs and their derivative channels (direct and indirect and of various different modes) can be considered as forming a "unified" dynamic shared or composite channel over which a number of virtual channels may be overlaid (i.e. the virtual channels are overlaid over the underlying common shared channel). In this context, a virtual channel can be considered as an overlay channel by which data can be directed to individual receivers even though a single common underlying signal is transmitted onto the underlying common channel; this can be achieved for example by means of a suitable multiple access technique such as Frequency Division Multiple Access (FDMA), Code Division Multiple Access (CDMA), Time Division Multiple Access (TDMA) or simply be using suitable encryption techniques, etc.

Referring now to the Figures, FIG. 1 is a schematic illustration (not to scale) of an example broadband deployment in which embodiments of a data transmission method may be employed.

In this example, the deployment comprises a Distribution Point Unit (DPU) 10 which is connected to three user premises 31,32, 33 (which in this example are flats within a single building 30) via respective Twisted Metallic Pair (TMP) connections 21, 22, 23 which connect between an Access Node (AN) 16 (which may, for example, be a DSLAM) within the DPU 10 and respective Customer Premises Equipment (CPE) modems 51, 52 via respective network termination points 41, 42 within the respective user premises 31, 32. The DPU 10 additionally includes an Optical Network Termination (ONT) device 14 which provides a backhaul connection from the DPU 10 to a local exchange building via an optical fibre connection such as a Passive Optic-fibre Network (PON) and a controller 12 which co-ordinates communications between the AN 16 and the ONT 14, and which may perform some management functions such as communicating with a remote Persistent Management Agent (PMA).

As will be apparent to a person skilled in the art, the illustrated deployment involving an optical fibre backhaul connection from a distribution point and a twisted metallic pair connection from the distribution point to the "customer" premises is a sort of deployment for which the G.FAST standard is intended to be applicable. In such a situation, the TMP connections may be as short as a few hundred metres or less, for example possibly a few tens of metres only, and because of this it tends to be possible to use very high frequency signals (e.g. up to a few hundred Megahertz) to communicate over the short TMPs because the attenuation of high frequency signals is insufficient to prevent them from carrying useful information because of the shortness of the channels. However, at such high frequencies crosstalk can become a significant issue. This tends to be the case where the cross-talking channels travel alongside each other for part of their extent (as in the situation illustrated in FIG. 1); however, cross-talk is also tends to be an issue at high frequencies (e.g. over 80 MHz) even where the channels only lie close to one another for a very small portion of their total extent (e.g. just when exiting the DPU 10). G.FAST proposes simply using vectoring techniques at all frequencies where there are cross-talking channels in order to mitigate against the cross-talk effects.

In some embodiments, by accessing at the DPU 10 (for example, at the AN 16) phantom channels, it is possible to exploit signals transmitted onto phantom channels which will "crosstalk" onto the conventional differential mode channels associated with each of the end user receivers (the termination point and CPE modem combinations 41/51, 42/52, 43/53) and change the signals received (compared to a conventional case where the phantom channels are not exploited in this way). Since there are three TMP connections 21-23, there are 3 possible (first order, pure) phantom channels which could be exploited in this way, formed by using the differential voltage signal between: the average voltage of TMP 21 and that of TMP 22; the average voltage of TMP 21 and that of TMP 23; and the average of TMP 22 and that of TMP 23. However, since there is no possible set of two of these possible (first order, pure) phantom channels which does not include at least one common TMP, only one of these can be used at the same time without having non-orthogonal (and hence complexly interfering) phantom channels being used simultaneously. Thus the present embodiment includes a Phantom Channel—Multiple Optimisation Problem device (PC-MOP) which, as is explained in greater detail below, acts to choose a single one out of the three possible phantom channels to use—the selection being performed such as to try to achieve a particular set of two (or more) objectives (e.g. to try to obtain the maximum benefit for two of the three receivers).

Figure 2:
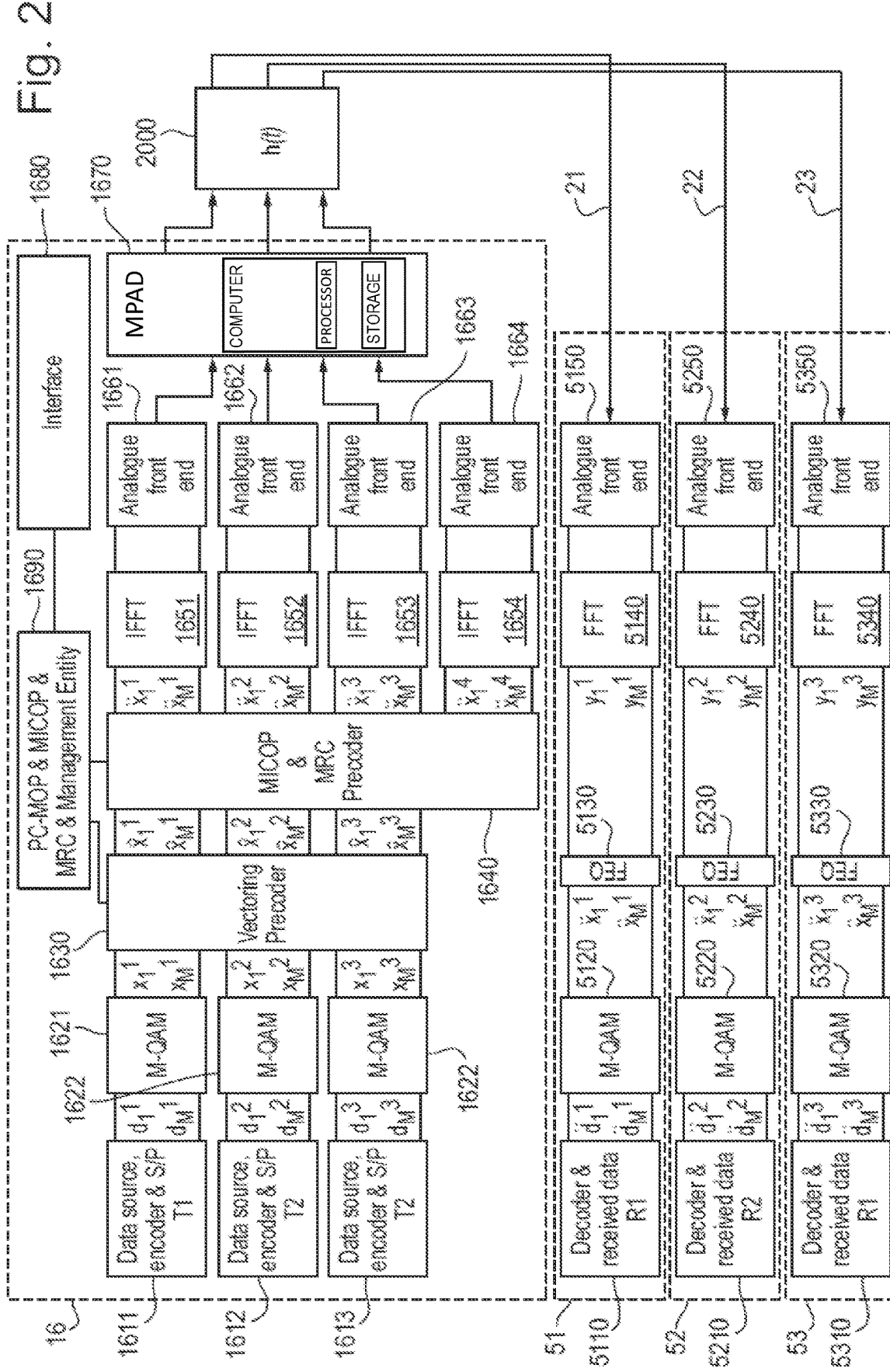
FIG. 2 is a schematic illustration (not to scale) showing further specific details of the broadband deployment.

FIG. 2 is a schematic illustration (not to scale) showing further details of the AN 16 and CPE modems 51, 52, 53 that allow for data transmission according to below described embodiments.

The AN 16 comprises first, second, and third Data Source, Data Encoder and Serial to Parallel converter (DSDESP) modules 1611, 1612 and 1613. These are essentially conventional functions within a DSL modem and will not be further described here except to point out that each one's output is a set of data values $d_1$-$d_M$ each of which can be mapped to both a set of one or more bits and to a point within a modulation signal constellation associated with a respective tone on which the data value is to be transmitted. For example, if a tone ti is determined to be able to carry 3 bits of data, a corresponding data value will be set to one of $2^3=8$ different values (e.g. to a decimal number between 0 and 7) each of which corresponds to a different constellation point within an associated signal constellation having 8 different constellation points. The data values for a single symbol can be thought of as forming a vector of data values (one for each data-carrying tone) and together carry the user data to be transmitted to the end user associated with a respective end user modem 51, 52, 53 together with any overhead data (e.g. Forward Error Correction data etc.).

The data values leaving each DSDESP module 1611, 1612, 1613 are then passed (in an appropriate order) to respective Multiple bit level Quadrature Amplitude Modulation (M-QAM) modulators 1621, 1622, 1623 which convert each input data value to a respective complex number $x_1^1$ to $x_M^1$, $x_1^2$ to $x_M^2$, and $x_1^3$ to $x_M^3$ each of which represents a complex point within a complex number constellation diagram. For example, a data value $d_1^1=7$ (=111 in binary) might be mapped by the M-QAM modulator 1621 to the complex number 1-$i$ for tone 1 where tone 1 has been determined (by say modem 51) to be able to carry 3 bits of data each.

Each of these complex numbers $x_1^1$ to $x_M^1$, $x_1^2$ to $x_M^2$, and $x_1^3$ to $x_M^3$ is then entered into a vectoring precoder module 1630 (which in the present embodiment is a single common vectoring precoder module 1630) which performs a largely conventional vectoring operation in order to precode the transmissions to be sent using a combination of predetermined vectoring coefficients and information about the signals to be transmitted onto the other channels within the relevant vector group in a manner, which is well known to those skilled in the art, to compensate for the expected effects of cross-talk from the other channels in the vector group.

In some embodiments, the vectoring precoder module 1630 is operable to additionally precode the transmissions in such a way as to cause them to be pre-compensated for the expected crosstalk effects produced not only by the neighbouring channels operating in a direct differential mode (as per standard vectoring), but also for the effects of crosstalk coming from any signals being transmitted onto one or more phantom channels (or other channels which are not direct differential mode channels). In order to do this, the vectoring precoder module 1630 may receive information about channel estimations of the respective phantom channel(s) (or other channels which are not direct differential mode channels) and also information about any weighting values used to combine signals to be transmitted over the phantom channel(s) (or other channels which are not direct differential mode channels).

An ability of the vectoring precoder module 1630 to receive the weighting values and channel estimation values, which it may use to perform its precoding functions, is illustrated in FIG. 2 by the line between the PC-MOP & MICOP & MRC & Management entity module 1690 (which performs general management functions in addition to its specific functions described in greater detail below and, for brevity, may hereinafter be referred to either as the "management entity" or the "PC-MOP module") and the vectoring precoder module 1630. In this embodiment, the PC-MOP module 1690 calculates appropriate values for the channel estimations and the weighting values required by the vectoring precoder module 1630 and the MICOP & MRC precoder module 1640. To do this, the PC-MOP module 1690 may use data reported back to it from the end user modems 51, 52, 53. The processes and procedures for achieving this are largely conventional and well known to persons skilled in the art and so they are not discussed in great detail herein except to note that it may utilise a backward path from the user modems 51, 52, 53 to the AN 16. This may be achieved in practice in that the user modems 51, 52, 53 are transceivers capable of receiving and transmitting signals over the TMPs 21, 22, 23 as is the AN 16 (e.g., via interface 1680 of AN 16). The receiver parts of the AN 16 and the transmitter parts of the user modems 51, 52, 53 have simply been omitted from the drawings to avoid unnecessary complication of the figures and because these parts are entirely conventional and not directly pertinent to the present invention. Moreover, each of the user modems 51, 52, 53 may additionally contain a management entity responsible for performing various processing and communication functions. Any of a multitude of suitable techniques can be employed for obtaining data useful in generating channel estimations. For example, known training signals can be transmitted onto selected channels by the AN 16 during a special training procedure and the results of detecting these by the user modems 51, 52, 53 can be sent back to the AN 16 in a conventional manner. Additionally, special synchronisation symbols can be transmitted, interspersed with symbols carrying user data, at predetermined "locations" within a "frame" comprising multiple symbols (e.g. at the beginning of each new frame) and the results of attempting to detect these synchronisation symbols can also be sent back to the AN 16 to generate channel estimation values. As is known to persons skilled in the art, different synchronisation signals/symbols can be sent over different channels simultaneously and/or at different times etc. so that different channel estimations (including importantly indirect channels and indirect channels can be targeted and evaluated, etc.

In this embodiment, the output from the vectoring precoder module 1630 is a set of further modified complex numbers $\hat{x}_1^1$ to $\hat{x}_M^1$, $\hat{x}_1^2$ to $\hat{x}_M^2$, and $\hat{x}_1^3$ to $\hat{x}_M^3$. These complex numbers are then passed to a Mixed-Integer Convex Optimisation Problem and Maximal Ratio Combiner (MICOP and MRC) precoder module 1640 (hereinafter referred to as the MICOP and MRC precoder module 1640) which, in the present embodiment, uses weighting values together with channel estimation values provided to it by the PC-MOP module 1690 to calculate, from the modified complex numbers received from the vectoring pre-coder module 1640 (and the weighting values and channel estimation values from the PC-MOP module 1690), further modified (or further pre-distorted) values for the complex numbers to be passed to the IFFTs 1651-1654. Thus, MICOP and MRC precoder module 1640 modifies the received numbers $\hat{x}_1^1$ to $\hat{x}_M^1$, $\hat{x}_1^2$ to $\hat{x}_M^2$, and $\hat{x}_1^3$ to $\hat{x}_M^3$ to generate corresponding further modified complex numbers to $\ddot{x}_1^1$ to $\ddot{x}_M^1$, $\ddot{x}$ and $\ddot{x}_M^2$, to $\ddot{x}_1^3$ to $\ddot{x}_M^3$ which form (ultimately) the signals to be used in driving the respective TMPs 21, 22, 23 in direct differential mode. Also, the MICOP and MRC precoder module 1640 may additionally generate a new set of complex numbers $\ddot{x}_1^4$ to $\ddot{x}_M^4$ for forming (ultimately) the signals to be used to drive a (single ended) phantom mode channel to be accessed via the MPAD module described below. Any appropriate way of doing this may be performed. For example, the method of transmitting data in differential and phantom modes that is described in WO 2016/139156 A1, which is incorporated herein in its entirety, may be implemented. Once these values have been calculated by the MICOP and MRC precoder 1640 they are passed to the respective IFFT modules 1651-1654, with super-script 1 values going to IFFT 1651, superscript 2 values going to IFFT 1652, and so on. The next two steps of the processing are conventional and not relevant to the present invention. Thus, each set of generated values (e.g. $\ddot{x}_1^1$ to $\ddot{x}_M^1$) is formed by the respective IFFT module into a quadrature time domain signal in the normal manner in Orthogonal Frequency Division Multiplexing (OFDM)/DMT systems. The time domain signals are then processed by a suitable Analogue Front End (AFE) module 1661 to 1664 again in any suitable such manner including any normal conventional manner. After processing by the AFE modules 1661-1664, the resulting analogue signals are passed to a Multiple Phantom Access device (MPAD) module 1670. In overview, the MPAD module 1670 provides switchable access to centre taps of any of the TMPs such that any of the possible phantom channels associated with the connected channels can be driven by the incoming signal arriving from AFE 1664 as well as directly passing on the signals from AFE's 1661-1663 directly to TMPs 21-23 for driving in the normal direct differential mode.

During transmission over the TMP connections 21, 22, 23 the signals will be modified in the normal way according to the channel response of the channel and due to external noise impinging onto the connections. In particular, there will typically be cross-talking (including, for example, far-end cross-talking) between the three direct channels (the direct channels being one from the transmitter 16 to the modems 41-43 via the TMPs 21-23) and the phantom channel. However, the effect of the precoding is to largely precompensate for the effects of the cross talk. Additionally, the targeted receivers may benefit from increased SNR of the received signal destined for them arriving via cross talk from the phantom channel.

After passing over the TMP connections 21, 22, 23 the signals are received by the modems 41-43 at a respective Analogue Front End (AFE) module 5150, 5250, 5350 which performs the usual analogue front end processing. The thus processed signals are then each passed to a respective Fast Fourier Transform (FFT) module 5140, 5240, 5340 which performs the usual conversion of the received signal from the time domain to the frequency domain. The signals leaving the FFT modules 5140, 5240, 5340, $y_1^1$ to $y_M^1$, $y_1^2$ to $y_M^2$, and $y_1^3$ to $y_M^3$, are then each passed, in the present embodiment, to a respective Frequency domain EQualiser (FEQ) module 5130, 5230, 5330. The operation of such frequency domain equaliser modules 5130, 5230, 5330 is well-known in the art and will not therefore be further described herein. It should be noted however, that any type of equalisation could be performed here, such as using a simple time-domain linear equalizer, a decision feedback equaliser, etc. For further information on equalisation in OFDM systems, the reader is referred to: "*Zero-Forcing Frequency-Domain Equalization for Generalized DMT Transceivers with Insufficient Guard Interval*," by Tanja Karp, Steffen Trautmann, Norbert J. Fliege, EURASIP Journal on Applied Signal Processing 2004:10, 1446-1459.

Once the received signal has passed through the AFE, FFT and FEQ modules, the resulting signals $\ddot{x}_1^1$ to $\ddot{x}_M^1$, $\ddot{x}$ to $\ddot{x}_M^2$, and $\ddot{x}_1^3$ to $\ddot{x}_M^3$ tend to be similar to the complex numbers $x_1^1$ to $x_M^1$, $x_1^2$ to $x_M^2$, and $x_1^3$ to $x_M^3$ originally output by the M-QAM modules 1621-1623, except that there may be some degree of error resulting from imperfect equalisation of the channel and the effect of external noise impinging onto the channels during transmission of the signals between the AN 16 and the modems 51, 52, 53. This error will in general differ from one receiving modem to the next. This can be expressed mathematically as $\ddot{x}_m^1 = x_m^1 + e_m^1$ etc. Provided the error however is sufficiently small the signal should be recoverable in the normal way after processing by the M-QAM demodulator modules 5120-5320 where a corresponding constellation point is selected for each value $\ddot{x}_m^i$ depending on its value (e.g. by selecting the constellation point closest to the point represented by the value $\ddot{x}_m^i$ unless trellis coding is being used, etc.). The resulting values $\ddot{d}_1^1$ to $\ddot{d}_M^1$, $\ddot{d}_1^2$ to $\ddot{d}_M^2$, and $\ddot{d}_1^3$ to $\ddot{d}_M^3$ should mostly correspond to the data values $d_1^1$ to $d_M^1$, $d_1^2$ to $d_M^2$, and $d_1^3$ to $d_M^3$ originally entered to the corresponding M-QAM modules 1621, 1622, 1623 respectively within the AN 16. These values are then entered into a respective decoder (and received data processing) module 5110, 5210 and 5230 which reassembles the detected data and performs any necessary forward error correction etc. and then presents the recovered user data to whichever service it is addressed to in the normal manner, thus completing the successful transmission of this data.

Following now from the above overview of FIG. 2, a more detailed explanation is provided of the non-conventional elements within the embodiment illustrated in FIG. 2 and described briefly above.

The MPAD 1670 is a component configured to determine, for each of the TMPs 21, 22, 23, and for each tone on which data is transmitted on the TMPs 21, 22, 23, a bit and power allocation with which to transmit data signals. In particular, the MPAD 1670 is configured to determine bit and power allocation such that the maximum capacities of the channels (i.e. the maximum transmission bit rates) are substantially achieved.

Apparatus, including the MPAD 1670, for implementing the above arrangement, and performing the method steps to be described later below, may be provided by configuring or adapting any suitable apparatus, for example one or more computers or other processing apparatus or processors, and/or providing additional modules. As illustrated is FIG. 2, the apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

What follows is a mathematical explanation of the functioning of certain elements of the above described system. This mathematical explanation is useful in the understanding of the embodiments of methods of determining the transmission powers for transmitting signals on the TMPs 21, 22, 23, which embodiments are described in more detail later below with reference to FIGS. 3 to 5.

Considering a system comprising a bundle of k TMPs and/or phantom channels, the full transmission characteristics for a single frequency of the channel may be represented as:

$$H = \begin{pmatrix} h_{1,1} & h_{1,2} & \cdots & h_{1,k} \\ h_{2,1} & h_{2,2} & \cdots & h_{2,k} \\ \vdots & \vdots & \ddots & \vdots \\ h_{k,1} & h_{k,2} & \cdots & h_{k,k} \end{pmatrix}$$

where $h_{i,j}$ indicates a channel transfer function, a value of which is dependent on crosstalk transmissions from the jth TMP/phantom channel onto the ith TMP/phantom channel. In other words, $h_{i,j}$ is a measure of the electromagnetic coupling of the jth channel to the ith channel. For example, $h_{i,j}$ may be indicative of the extent of coupling between the jth channel and the ith channel. Values of $h_{i,j}$ may be dependent on an attenuation on the amplitude of signals on the ith channel caused by the jth channel. Values of $h_{i,j}$ may be dependent on a delay and/or phase shift on the phase of signals on the ith channel caused by the jth channel.

In this embodiment, the channel transfer matrix H is known i.e. measured. For example, the channel transfer matrix H may be determined using known channel estimation techniques.

Values of $h_{i,j}$ may be measured, for example, using test signals, by the MPAD 1670. Measurement of the $h_{i,j}$ values may comprise, or be regarded as equivalent to, measuring one or more of the following parameters selected from the group of parameters consisting of: a channel response of the ith channel under conditions in which the jth channel (e.g. only the jth channel) is transmitting crosstalk interference onto the ith channel, an impulse response of the ith channel under conditions in which the jth channel (e.g. only the jth channel) is transmitting crosstalk interference onto the ith channel, and a frequency response of the ith channel under conditions in which the jth channel (e.g. only the jth channel) is transmitting crosstalk interference onto the ith channel.

The bundle of k TMPs and/or phantom channels may be contained in a common binder.

In this example, there is little to no interaction between different TMPs/phantom channels, for example as a result of the above described vectoring process. Thus, the non-diagonal element of H are relatively small compared to the diagonal elements of H and can therefore be assumed to be zero.

As mentioned above, in operation, the MPAD 1670 determines a bit and power allocation for the TMPs/phantom channels to attempt to achieve maximum channel capacity.

The maximum capacity of a channel (which may also be referred to as Shannon's capacity limit) is expressed as:

$$C = B\log_2\left(1 + \frac{S}{N}\right)$$

where: C is the maximum capacity of the channel (in bits/second) for the given channel; B is the bandwidth of the channel (in Hertz); S is the signal power (in Watts); and N is the noise power (in Watts). The ratio S/N is called the Signal to Noise Ratio (SNR).

Thus, the bit and power allocation problem that is solved by the MPAD 1670 is that of, for each of the j TMPs/phantom channels, maximising the following objective function:

$$C_j = \sum_{m=1}^{M} \rho_{j,j}^m \log_2\left(1 + \frac{s_{j,j}^m \gamma_{j,j}^m}{\rho_{j,j}^m}\right) \quad (1)$$

where: j is an index for the different the TMPs/phantom channels, j=1, . . . k;

m is a frequency index for the M different tones, m= 1, . . . M;

$\rho_{j,j}^m$ is a binary allocation factor, where $\rho_{j,j}^m$=1 if transmission power is allocated to the jth TMP/phantom channel for the mth tone, and $\rho_{j,j}^m = 0$ if transmission power is not allocated to the jth TMP/phantom channel for the mth tone;

$s_{j,j}^m$ is a power level for transmission on the jth TMP/phantom channel and mth tone; and $\gamma_{j,j}^m$ is a channel gain of the jth TMP/phantom channel for the mth tone, $\gamma_{j,j}^m$ being a ratio of power coupling coefficient to the noise level, i.e.

$$\left(\frac{|h_{j,j}|^2}{n_{j,j}}\right)_m,$$

where $n_{j,j}$ is a noise level on the jth TMP/phantom channel for given tone m. The channel gain $\gamma_{i,j}^m$ can also include other factors, for example one or more factors selected from the group of factors consisting of: coding gain, margin, gap value, and deterministic noise signals.

In this embodiment, the above objective function (equation (1)) is optimised with respect to the following constraints:

$$\sum_{m=1}^{M} s_{j,j}^m \leq P_T \quad (2)$$

$$\sum_j \rho_{j,j}^m \leq K, \forall m \quad (3)$$

$$s_{j,j}^m \leq p_m, \forall m \quad (4)$$

$$b_{min} \leq \rho_{j,j}^m \log_2\left(1 + \frac{s_{j,j}^m \gamma_{j,j}^m}{\rho_{j,j}^m}\right) \leq b_{max} \quad (5)$$

where: $P_T$ is the maximum transmitting power (also known as the Aggregate Transmit power (ATP)) permitted for the bundle of k TMPs and/or phantom channels;

$p_m$ is a transmission power mask for tone m. In this embodiment, the power mask is an upper threshold for power for signal transmission at tone m above which power value transmission is not permitted. The transmission power mask(s) may be set, for example, by an official regulatory body;

$b_{min}$ is a lower bound for the channel capacity. In this embodiment, $b_{min}$ is set to zero (0). However, in other embodiments, $b_{min}$ may have a different appropriate value;

$b_{max}$ is an upper bound for the channel capacity. In this embodiment, $b_{max}$ is a bit limit for the TMPs and/or phantom channels. Values for $b_{min}$ and/or $b_{max}$ may result from hardware limitations.

The above objective function (equation (1)) is a concave objective function that is to be maximised subject to the constraints in equations (2)-(5). Since the objective function (equation (1)) is concave, its optimisation is tractable. The optimisation of the objective function (equation (1)) proceeds with the Lagrangian as follows:

$$\mathcal{L} = \sum_{m,j} \rho_{j,j}^m \log_2\left(1 + \frac{s_{j,j}^m \gamma_{j,j}^m}{\rho_{j,j}^m}\right) - \Omega_{j,j}\left(\sum_m s_{j,j}^m - P_T\right) - \quad (6)$$

$$\sum_m \mu_{j,j}^m\left(\sum_j \rho_{j,j}^m - 1\right) - \sum_m \eta_{j,j}^m\left(\sum_j s_{j,j}^m - p_m\right) -$$

-continued $$\sum_m \beta_{max_{j,j}}^m\left[\rho_{j,j}^m \log_2\left(1 + \frac{s_{j,j}^m \gamma_{j,j}^m}{\rho_{j,j}^m}\right) - b_{max}\right] -$$

$$\sum_m \beta_{min_{j,j}}^m\left[\rho_{j,j}^m \log_2\left(1 + \frac{s_{j,j}^m \gamma_{j,j}^m}{\rho_{j,j}^m}\right) - b_{min}\right] \text{ where}$$

$\Omega_{j,j}, \eta_{j,j}^m, \mu_{j,j}^m, \beta_{max_{j,j}}^m,$ and $\beta_{min_{j,j}}^m$ are Lagrangian multipliers.

To solve (6) and to show its optimality, in this embodiment the Karush Kuhn Tucker (KKT) conditions are satisfied. These conditions are as follows:

1. Feasibility of the primal constraints as well as the multipliers, i.e.

$\Omega_{j,j}, \eta_{j,j}^m, \mu_{j,j}^m, \beta_{max_{j,j}}^m,$ and $\beta_{min_{j,j}}^m \geq 0$ 2. The gradient of the Lagrangian (equation (6)) with respect to s, and the gradient of the Lagrangian (equation (6)) with respect to $\rho$ both become zero.

Differentiating the Lagrangian (equation (6)) with respect to s, i.e. $d\mathcal{L}/ds = 0$, and rearranging for s gives the optimal power formula:

$$s_{j,j}^m = \rho_{j,j}^m\left[\frac{\left(1 - \beta_{max_{j,j}}^m - \beta_{min_{j,j}}^m\right)}{(\Omega_{j,j} + \eta_{j,j}^m)\ln 2} - \frac{1}{\gamma_{j,j}^m}\right] \text{(Watt/Hz)} \quad (7)$$

Differentiating the Lagrangian (equation (6)) with respect to $\rho$, i.e. $d\mathcal{L}/d\rho = 0$, and rearranging for $\mu$ gives:

$$\mu_{j,j}^m = \left(1 - \beta_{max_{j,j}}^m - \beta_{min_{j,j}}^m\right) \quad (8)$$

$$\left\{\log_2\left[\frac{\gamma_{j,j}^m\left(1 - \beta_{max_{j,j}}^m - \beta_{min_{j,j}}^m\right)}{\ln 2(\Omega_{j,j} + \eta_{j,j}^m)}\right] - \left[\frac{1}{\ln 2} - \frac{(\Omega_{j,j} + \eta_{j,j}^m)}{\gamma_{j,j}^m\left(1 - \beta_{max_{j,j}}^m - \beta_{min_{j,j}}^m\right)}\right]\right\}$$

Figure 3:
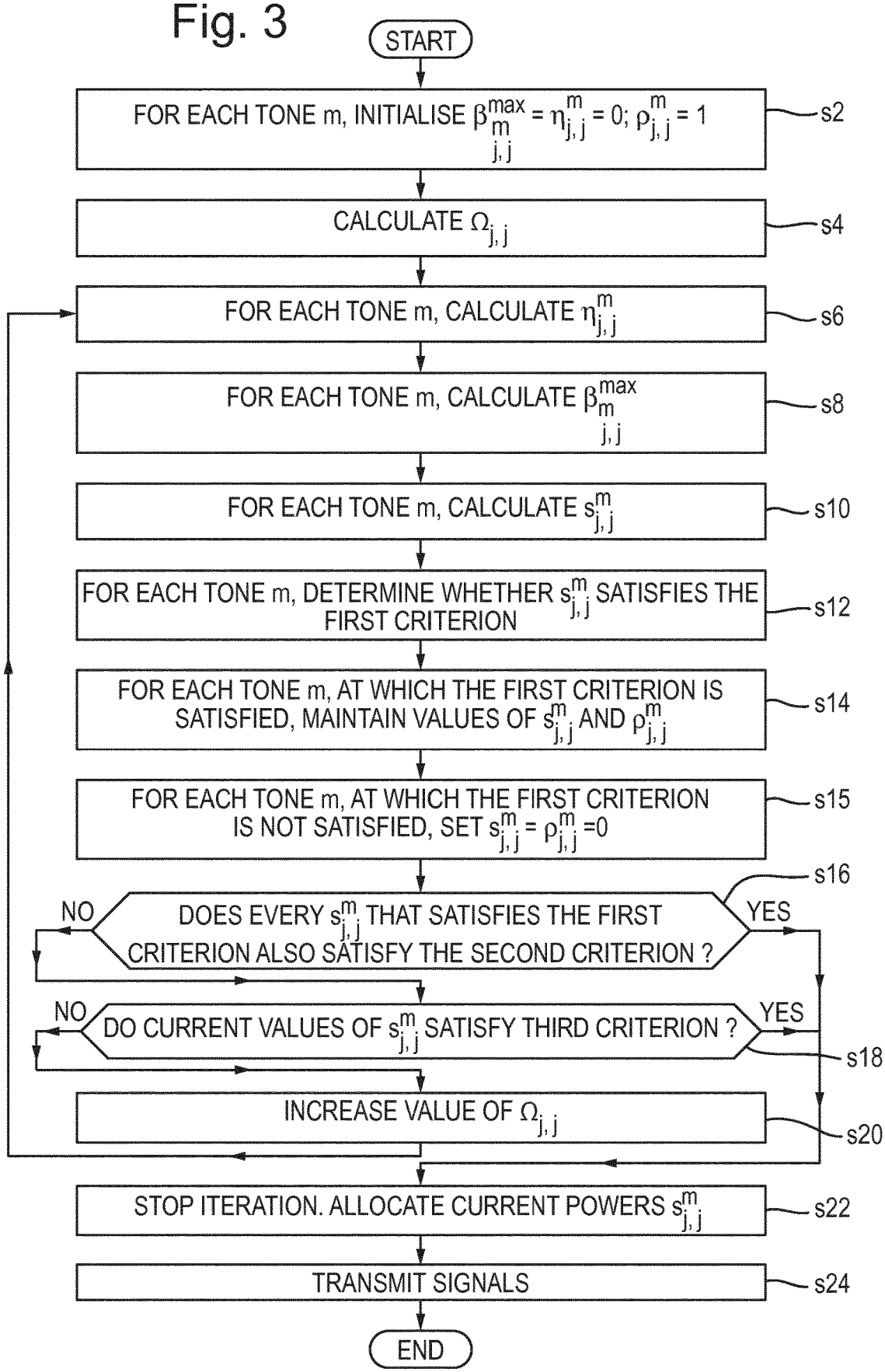
FIG. 3 is a process flow chart showing certain steps of a first bit and power allocation process.

What will now be described with reference to FIG. 3 is an embodiment of determining a bit and power allocation for the TMPs/phantom channels which tends to achieve substantially maximum channel capacity. In this embodiment, this method is performed by the MPAD 1670. However, in other embodiments, bit and power allocation is performed by a different entity instead of or in addition to the MPAD 1670.

FIG. 3 is a process flow chart showing certain steps of an embodiment of the bit and power allocation process.

In this embodiment, $b_{min} = 0$. Thus, also $$\beta_{min_{j,j}}^m = 0.$$

However, in some embodiments, $b_{min}$ may have a different, non-zero value. Also, in some embodiments, $$\beta_{min_{j,j}}^m$$

may have a different, non-zero value.

The process shown in FIG. 3 and described in more detail below is described as being performed for the jth TMPs/phantom channel. It will be appreciated by those skilled in the art however, that the process shown in FIG. 3 and described in more detail later below is, in practice, performed for more than one (and preferably, each) of the different TMPs/phantom channels, j=1, . . . k, such that maximum channel capacity on the k bundled TMPs tends to be achieved. Also, the process shown in FIG. 3 and described in more detail below for each of the different TMPs/phantom channels j may be performed in parallel, partially in parallel, or in series.

At step s2, for each tone m, $$\beta_{max_{j,j}}^m$$

and $\eta_{j,j}^m$ zero, and $\rho_{j,j}^m$ is initialised to one. That is to say:

$$\beta_{max_{j,j}}^m = \eta_{j,j}^m = 0$$

$$\rho_{j,j}^m = 1.$$

At step s4, for the jth channel, a value of $\Omega_{j,j}$ is computed. In this embodiment, $\Omega_{j,j}$ is computed by using equations (7) and (2), with the parameters initialised as in step s2. In particular, equation (7) is plugged into equation (2) to give:

$$\Omega_{j,j} = \frac{M}{\ln 2 \left( \frac{P_T}{\Delta_f} + \sum_m \frac{1}{\gamma_{j,j}^m} \right)} \quad (9)$$

where: M is the number of different tones; and
$\Delta_f$ is a frequency spacing between adjacent tones.

In this embodiment, the value of $\Omega_{j,j}$ is computed using a measured value of $h_{j,j}$.

At step s6, for each tone m, a value for $\eta_m$ is computed. In this embodiment, $\eta_m$ is computed by using equation (7) and the value for $\Omega$ computed at step s4. In particular, equation (7) is set equal to $p_m$ (i.e. the transmission power mask for tone m), and the rearranged for $\eta_m$ to give:

$$\eta_{j,j}^m = \frac{\gamma_{j,j}^m \left(1 - \beta_{max_{j,j}}^m\right)}{(\ln 2)(1 + p_m \gamma_{j,j}^m)} - \Omega_{j,j} \quad (10)$$

At step s8, for each tone m, a value for $$\beta_{max_{j,j}}^m$$

is computed. In this embodiment, $$\beta_{max_{j,j}}^m$$

is computed using equation (7) and the equation $\log_2(1+s_{i,j}^m \gamma_{i,j}^m)=b_{max}$. In particular, equation (7) is plugged into $\log_2(1+s_{i,j}^m \gamma_{i,j}^m)=b_{max}$ and rearranged for $$\beta_{max_{i,j}}^m$$

to give:

$$\beta_{max_{j,j}}^m = 1 - \frac{2^{b_{max}}(\ln 2)(\Omega_{j,j} + \eta_{j,j}^m)}{\gamma_{j,j}^m} \quad (11)$$

At step s10, for each tone m, a value for $s_{j,j}^m$ is computed. In this embodiment, $s_{j,j}^m$ is computed by using equation (4) and the values for $\Omega_{j,j}$, $\eta_{j,j}^m$ and $$\beta_{max_{j,j}}^m$$

computed at steps s4, s6, and s8 respectively.

At step s12, for each tone m, it is determined whether or not the calculated value of $s_{j,j}^m$ for that tone m satisfies a first criterion. In this embodiment, the first criterion is:

$$\log_2(1+s_{j,j}^m \gamma_{j,j}^m) > 0 \quad (12)$$

At step s14, for each tone m for which $s_{j,j}^m$ satisfies the first criterion (i.e. that satisfies $\log_2(1+s_{j,j}^m \gamma_{j,j}^m)>0$ in this embodiment), the values for $s_{j,j}^m$ and $\rho_{j,j}^m$ of that tone are maintained.

At step s15, for each tone m for which $s_{j,j}^m$ fails to satisfy the first criterion (i.e. for which, in this embodiment, $\log_2(1+s_{j,j}^m \gamma_{j,j}^m) \le 0$ (and in practice=0)), the values for $s_{j,j}^m$ and $\rho_{j,j}^m$ of that tone are zeroed. That is to say, step s15 comprises setting $s_{j,j}^m = \rho_{j,j}^m = 0$ for each tone m for which $\log_2(1+s_{j,j}^m \gamma_{j,j}^m) \le 0$.

At step s16, for each tone m for which $s_{j,j}^m$ satisfies the first criterion (i.e. that satisfies $\log_2(1+s_{j,j}^m \gamma_{j,j}^m)>0$ in this embodiment), it is determined whether or the calculated value of $s_{j,j}^m$ for that tone m satisfies a second criterion. In this embodiment, the second criterion is:

$$\log_2(1+s_{j,j}^m \gamma_{j,j}^m) \le b_{max} \quad (13)$$

If, at step s16, it is determined that all of the $s_{j,j}^m$ values which satisfy the first criterion (equation (12)) also satisfy the second criterion (equation (13)), then the method proceeds to step s22. Step s22 will be described in more detail later below, after a description of method steps s18 to s20.

However, if, at step s16, it is determined that not all of the $s_{j,j}^m$ values which satisfy the first criterion (equation (12)) also satisfy the second criterion (equation (13)), then the method proceeds to step s18.

At step s18, it is determined whether or not the current values of $s_{j,j}^m$ satisfy a third criterion. In this embodiment, the third criterion is:

$$\Delta_f \sum_{m=1}^{M} s_{j,j}^m \le P_T \quad (14)$$

If, at step s18, it is determined that the third criterion (equation (14)) is satisfied, then the method proceeds to step s22. Step s22 will be described in more detail later below, after a description of method steps s20.

In some embodiments, equation (14) is deemed to be satisfied if $$\Delta_f \sum_{m=1}^{M} s_{j,j}^m$$

is within a predetermined tolerance range of $P_T$, for example within $10^{-3}$ or $10^{-4}$ of $P_T$.

If, at step s18, it is determined that the third criterion (equation (14)) is not satisfied (i.e. it is determined instead that $$\Delta_f \sum_{m=1}^{M} s_{j,j}^m > P_T \Big)$$

then the method proceeds to step s20.

At step s20, for each tone m, the value of $\Omega$ is increased. In some embodiments, for one or more of the tones m, $\Omega$ is increased by $f(\Omega)$. By way of example, $f(\Omega)$ may be equal to about $\Omega/20$, $\Omega/10$, or $\Omega/5$. In some embodiments, $\Omega$ is increased by a predetermined value. In some embodiments, for each tone m, the value of $\Omega$ is decreased instead of being increased.

After step s20, the method proceeds back to step s6, at which point the values for $\eta_{j,j}^m$ are updated, in turn leading to revised/updated values for $s_{j,j}^m$ and $\rho_{j,j}^m$. Thus, the process of FIG. 3 is an iterative process that iterates until either: 1) it is determined at step s16 that every tone m which did satisfy the first criterion also satisfies the second; or 2) it is determined at step s18 that the third criterion is satisfied.

Returning now the case where either 1) it is determined at step s16 that every tone m which did satisfy the first criterion (equation (12)) also satisfies the second criterion (equation (13)); or 2) it is determined at step s18 that the third criterion (equation (14)) is satisfied, the method proceeds to step s22.

At step s22, the iterative process of steps s6 to s20 is stopped. Also, each tone m (m=1, . . . , M) for the jth TMP/phantom channel is allocated its respective current power value $s_{j,j}^m$. It is worth noting that some tones may be not allocated any power, i.e. due to $s_{j,j}^m$ and $\rho_{j,j}^m$ for those tones having been set to zero.

At step s24, the AN 16 transmits signals in accordance with power values allocated at step s22. For example, for each tone m, the AN 16 may transmit a signal having transmission power $s_{j,j}^m$ at tone m along the jth TMP/phantom channel.

As noted earlier above, the process shown in FIG. 3 and described in more detail above may be, in practice, performed for each of the different channels, j=1, . . . k. Thus, at step s24, for one or more of the tones m, and for one or more of the j TMPs and/or phantom channels, the AN 16 may transmit a signal having transmission power $s_{j,j}^m$ at tone m along the jth channel. For example, at step s24, for each tone m (m=1, . . . M), and for each channel j (j=1, . . . , k), the AN 16 may transmit a signal having transmission power $s_{j,j}^m$ at that tone m along the that channel.

Thus, an embodiment of the bit and power allocation process is provided.

Advantageously, the method shown in FIG. 3 and described in more detail above tends to ensure that multiple paths between the AN 16 and the CPE modems 51, 52, 53 are jointly optimised. Thus, the overall channel capacity tends to be optimised.

A further advantage provided by the method shown in FIG. 3 and described in more detail above is that convergence to an optimal solution for the objective function (equation (1)) tends to be faster compared to conventional "water-filling" algorithms. For example, use of above equation (9) for $\Omega$ tends to provide that the starting point for the iterative optimisation process begins closer to a solution compared to conventional techniques. In some embodiments, $\Omega$ may be bi-sectioned, which tends to ensure that the total power constraint is unviolated. For example, $\Omega_{j,j}^m$ can be bi-sectioned by a variable step size to ensure the algorithm iterates in one direction (filling the constraints rather decreasing). To ensure this, a scaling factor of <1 can be multiplied by $\Omega_{j,j}^m$, and then $\Omega_{j,j}^m$ may be iteratively increased using, for example, the bi-section method, backtacking or line-search until convergence. Thus, the time taken to find optimal bit and power allocation tends to be reduced.

Figure 4:
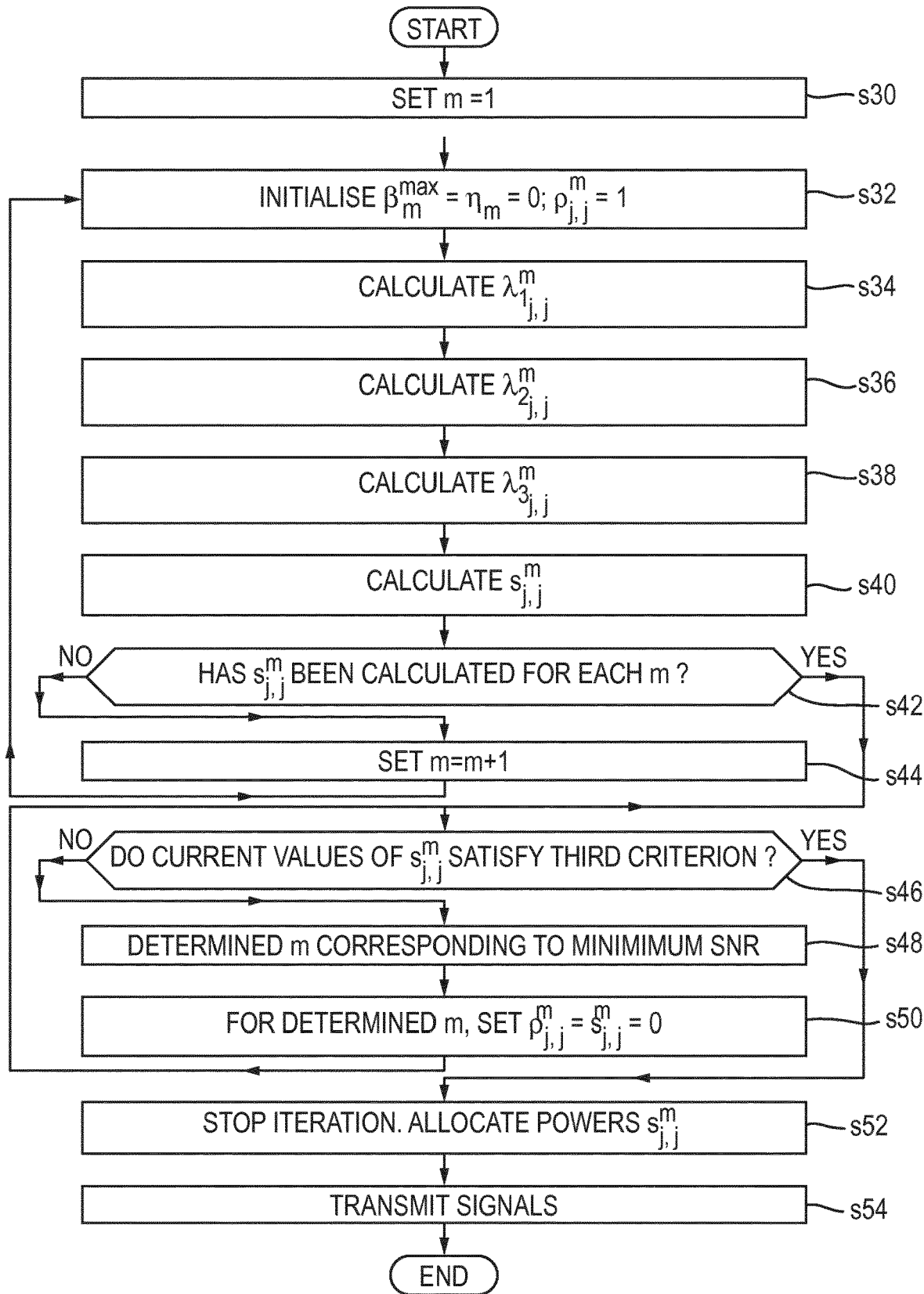
FIG. 4 is a process flow chart showing certain steps of a second bit and power allocation process.

What will now be described, with reference to FIG. 4, is a first optional additional processes that may be used in conjunction with (e.g. in parallel, partially in parallel, or in series) the embodiment shown in FIG. 3 and described in more detail earlier above.

The process shown in FIG. 4 and described in more detail later below may be used to initialise transmission of signals between the AN 16 and the CPE modems 51, 52, 53, e.g. while the process of FIG. 3 is being performed. The process shown in FIG. 4 and described in more detail later below tends to produce a suboptimal solution for the objective function (equation (1)), but tends to provide a solution in a shorter time than the process shown in FIG. 3 and described above. Thus, in some embodiments, transmission of signals between the AN 16 and the CPE modems 51, 52, 53 may be initially performed using values calculated using the process shown in FIG. 4 and described in more detail later below, before switching to the optimal values calculated using than the embodiment of FIG. 3, once those optimal values have been calculated.

FIG. 4 is a process flow chart showing certain steps of a first example of a further bit and power allocation process that may be used with the above described embodiment.

In this embodiment, $b_{min}=0$. Thus, also $$\beta_{min_{j,j}}^m = 0.$$

However, in some embodiments, $b_{min}$ may have a different, non-zero value. Also, in some embodiments, $$\beta_{min_{j,j}}^m$$

may have a different, non-zero value. For instance, if $b<b_{min}$ then $$\beta_{min_{j,j}}^m = 1 \text{ and } \beta_{max_{j,j}}^m = 0$$

forcing the power allocation to become zero.

The process shown in FIG. 4 and described in more detail below is described as being performed for the jth TMPs/phantom channel. It will be appreciated by those skilled in the art however, that the process shown in FIG. 4 and described in more detail later below is, in practice, performed for more than one (and preferably, each) of the different TMPs/phantom channels, j=1, . . . k. Where the process shown in FIG. 4 is performed for each of multiple different TMPs/phantom channels j, those processes may be performed in parallel, partially in parallel, or in series.

At step s30, the tone index m is initialised to 1, i.e. m=1.
At step s32, for tone m, $$\beta_{max\,j,j}^m$$

and $\eta_{j,j}^m$ are initialised to zero, and $\rho_{j,j}^m$ is initialised to one. That is to say:

$$\beta_{max\,j,j}^m = \eta_{j,j}^m = 0$$

$$\rho_{j,j}^m = 1.$$

At step s34, for tone m, a value of a first function, $$\lambda_{1\,j,j}^m,$$

is computed. In this embodiment, the first function is:

$$\lambda_{1\,j,j}^m = f(\gamma, p_m)$$

In this embodiment, $$\lambda_{1\,j,j}^m$$

is computed by using equation (7), with the parameters initialised as in step s32, and with $s_{j,j}^m$ set to $p_m$. In particular, equation (7), with the parameters initialised as in step s32 and with $s_{j,j}^m$ set equal to $p_m$ is rearranged for $\Omega$ to give:

$$\lambda_{1\,j,j}^m = \frac{1}{(\ln 2)\left(p_m + \frac{1}{\gamma_{j,j}^m}\right)} \quad (15)$$

At step s36, for tone m, a value of a second function, $$\lambda_{2\,j,j}^m,$$

is computed.
In this embodiment, the second function is:

$$\lambda_{2\,j,j}^m = g(\gamma, b_{max})$$

The computed value $$\lambda_{2\,j,j}^m$$

may be considered to be a second estimate of the parameter $\Omega$. In this embodiment, $$\lambda_{2\,j,j}^m$$

is computed by using equations (7) and (13), with the parameters initialised as in step s32. In particular, equation (7) with the parameters initialised as in step s32, is plugged into equation (13) and rearranged for $\Omega$ to give:

$$\lambda_{2\,j,j}^m = \frac{\gamma_{j,j}^m}{2^{b_{max}} \ln 2} \quad (16)$$

At step s38, for tone m, a value of a third function, $$\lambda_{3\,j,j}^m,$$

is computed. In this embodiment, the third function is:

$$\lambda_{3\,j,j}^m = \max\{\lambda_{1\,j,j}^m, \lambda_{2\,j,j}^m\} \quad (17)$$

However, in other embodiments the third function is a different function, e.g. a different function of the first and second functions, $$\lambda_{1\,j,j}^m \text{ and } \lambda_{2\,j,j}^m.$$

For example, the third function $$\lambda_{3\,j,j}^m$$

may be $$\lambda_{3\,j,j}^m = \min\{\lambda_{1\,j,j}^m, \lambda_{2\,j,j}^m\} \text{ or } \lambda_{3\,j,j}^m = \text{mean}\{\lambda_{1\,j,j}^m, \lambda_{2\,j,j}^m\}.$$

At step s40, for tone m, a value for $s_{j,j}^m$ is computed. In this embodiment, $s_{j,j}^m$ is computed as follows:

$$s_{j,j}^m = \frac{1}{(\ln 2)\lambda_{3\,j,j}^m} - \frac{1}{\gamma_{j,j}^m} \quad (18)$$

At step s42, it is determined whether or not a value of $s_{j,j}^m$ has been computed for each tone m=1, ..., M.
If, at step s42, it is determined that a value of $s_{j,j}^m$ has not been computed for each tone m=1, ..., M, the method proceeds to step s44.
However, if, at step s42, it is determined that a value of $s_{j,j}^m$ has been computed for each tone m=1, ..., M, the method proceeds to step s46.
At step s44, the tone index m is incremented by 1, i.e. m=m+1.
After step s44, the methods proceeds back to step s32, thereby to determine a value of $s_{j,j}^m$ for the updated tone value.
Returning now to the case where, at step s42, it is determined that a value of $s_{j,j}^m$ has been computed for each tone m=1, ..., M, at step s46 it is determined whether or not the determined values for $s_{j,j}^m$, m=1, ..., M satisfy the third criterion (i.e. equation 14), which is described in more detail earlier above with reference to step s18 of FIG. 3.
In this embodiment, at step s46, if it is determined that the third criterion (equation (14)) is satisfied, then the method proceeds to step s52. Step s52 will be described in more detail later below, after a description of method steps s48 and s50.

However, if, at step s46, it is determined that the third criterion (equation (14)) is not satisfied (i.e. it is determined instead that $$\Delta_f \sum_{m=1}^{M} s_{j,j}^m > P_T \Bigg),$$

then the method proceeds to step s48.

At step s48, the value of m that gives $$\min_m \log_2 \left(1 + \frac{s_{j,j}^m \gamma_{j,j}^m}{\rho_{j,j}^m}\right)$$

is determined. This determined value of m is denoted $\hat{m}$.

In other words, the tone $\hat{m}$ that corresponds to the minimum signal-to-noise ratio (SNR) is determined.

At step s50, the power allocation factor corresponding to the determined tone $\hat{m}$ is set equal to zero and/or the power allocated to the determined tone $\hat{m}$ is set equal to zero. In other words, $\rho_{j,j}^{\hat{m}}=0$ and/or $s_{j,j}^{\hat{m}}=0$.

After step s50, the method returns to step s46 whereat the third criterion (equation 14) is retested.

Returning now to the case where, at step s46, it is determined that the third criterion (equation (14)) is satisfied, then at step s52, each tone m (m=1, . . . , M) for the jth TMP/phantom channel is allocated its respective current power value $s_{j,j}^m$.

At step s54, the AN 16 transmits signals in accordance with power values allocated at step s52. For example, for each tone m, the AN 16 may transmit a signal having transmission power $s_{j,j}^m$ at tone m along the jth TMP/phantom channel.

As noted earlier above, the process shown in FIG. 4 and described in more detail above may be, in practice, performed for each of the different TMPs/phantom channels, j=1, . . . k. Thus, at step s54, for one or more of the tones m, and for one or more of the j TMPs and/or phantom channels, the AN 16 may transmit a signal having transmission power $s_{j,j}^m$ at tone m along the jth TMP/phantom channel. For example, at step s54, for each tone m (m=1, . . . , M), and for each TMP and/or phantom channel j (j=1, . . . , k), the AN 16 may transmit a signal having transmission power $s_{j,j}^m$ at tone m along the jth TMP/phantom channel.

Thus, a first example of a further bit and power allocation process is provided.

Advantageously, the method shown in FIG. 4 and described in more detail above tends to provide for rapid initialising of signal transmission between the AN 16 and the CPE modems 51, 52, 53. While in some cases, the signal powers determined using the process of FIG. 4 may be sub-optimal compared to those determined by the process shown in FIG. 3, the process of FIG. 4 is nevertheless beneficial as it tends to be performable in relatively shorter time. Thus, the bit and power allocations determined using the process of FIG. 4 may be implemented for signal transmission while the iterative process of FIG. 3 is being performed, to allow signal transmission between the AN 16 and the CPE modems 51, 52, 53 to begin earlier.

Furthermore, the method shown in FIG. 4 and described in more detail above tends to provide a solution for the objective function (equation (1)) in shorter time relative to conventional "water-filling" algorithms.

In the method shown in FIG. 4 and described in more detail above, bandwidth adjustment is performed to ensure that the ATP is satisfied, by gradually reducing the number of the allocated tones.

Figure 5:
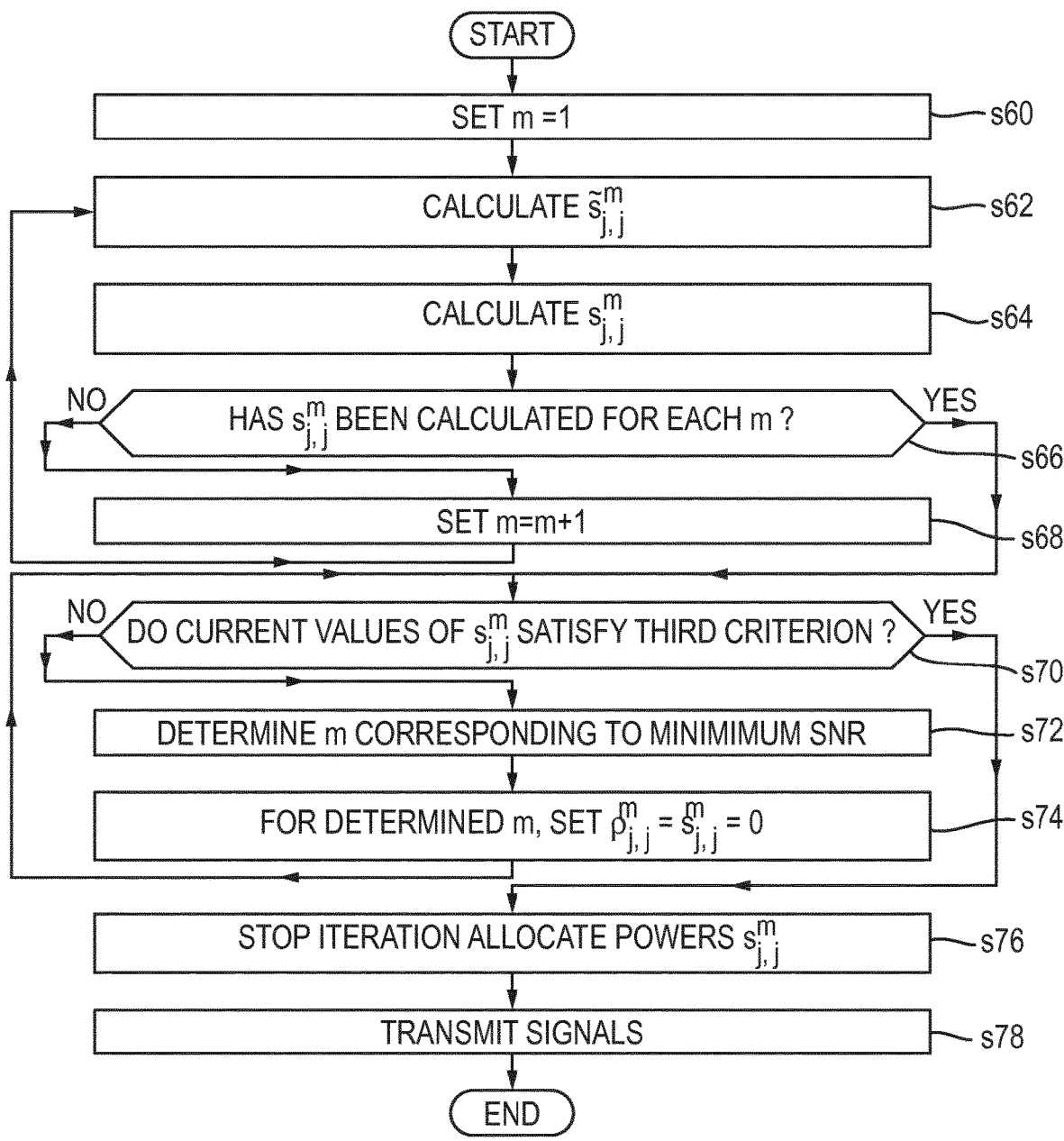
FIG. 5 is a process flow chart showing certain steps of a third bit and power allocation process.

What will now be described, with reference to FIG. 5, is a second optional additional processes that may be used in conjunction with (e.g. in parallel, partially in parallel, or in series) the embodiment shown in FIG. 3 and described in more detail earlier above. In some embodiments, second optional additional processes described in more detail later below with reference to FIG. 5 is used in conjunction with (e.g. in parallel, partially in parallel, or in series) the process shown in FIG. 4 and described in more detail earlier above.

The process shown in FIG. 5 and described in more detail later below may be used to initialise transmission of signals between the AN 16 and the CPE modems 51, 52, 53, e.g. while the process of FIG. 3 is being performed. The process shown in FIG. 5 and described in more detail later below tends to produce a suboptimal solution for the objective function (equation (1)), but tends to provide a solution in a shorter time than the embodiment of FIG. 3. Thus, in some embodiments, transmission of signals between the AN 16 and the CPE modems 51, 52, 53 may be initially performed using values calculated using the process shown in FIG. 5 and described in more detail later below, before switching to the optimal values calculated using than the embodiment of FIG. 3, once those optimal values have been calculated.

FIG. 5 is a process flow chart showing certain steps of a second example of a further bit and power allocation process that may be used with the above described embodiment.

The process shown in FIG. 5 and described in more detail below is described as being performed for the jth TMPs/phantom channel. It will be appreciated by those skilled in the art however, that the process shown in FIG. 5 and described in more detail later below is, in practice, performed for more than one (and preferably, each) of the different TMPs/phantom channels, j=1, . . . k. Where the process shown in FIG. 5 is performed for each of multiple different TMPs/phantom channels j, those processes may be performed in parallel, partially in parallel, or in series.

At step s60, the tone index m is initialised to 1, i.e. m=1.

At step s62, for tone m, a value of a power function, $\tilde{s}_{j,j}^m$, is computed. In this embodiment, the power function, $\tilde{s}_{j,j}^m$, is determined based on equation (13). In particular, $s_{j,j}^m$ in equation (13) is set to be equal to $\tilde{s}_{j,j}^m$ and then rearranged for $\tilde{s}_{j,j}^m$ to give:

$$\tilde{s}_{j,j}^m = \frac{2^{b_{max}} - 1}{\gamma_{j,j}^m} \tag{19}$$

At step s64, for each tone m, a value for $s_{j,j}^m$ is computed. In this embodiment, $s_{j,j}^m$ is computed as follows:

$$s_{j,j}^m = \min\{p_m, \tilde{s}_{j,j}^m\} \tag{20}$$

At step s66, it is determined whether or not a value of $s_{j,j}^m$ has been computed for each tone m=1, . . . , M.

If, at step s66, it is determined that a value of $s_{j,j}^m$ has not been computed for each tone m=1, . . . , M, the method proceeds to step s68.

However, if, at step s66, it is determined that a value of $s_{j,j}^m$ has been computed for each tone m=1, . . . , M, the method proceeds to step s70.

At step s68, the tone index m is incremented by 1, i.e. m=m+1.

After step s68, the methods proceeds back to step s62, thereby to determine a value of $s_{j,j}^m$ for the updated tone value.

Returning now to the case where, at step s66, it is determined that a value of $s_{j,j}^m$ has been computed for each tone m=1, . . . , M, at step s70 it is determined whether or not the determined values for $s_{j,j}^m$, , m=1, . . . , M satisfy the third criterion (i.e. equation 14), which is described in more detail earlier above with reference to step s18 of FIG. 3.

In this embodiment, at step s70, if it is determined that the third criterion (equation (14)) is satisfied, then the method proceeds to step s76. Step s76 will be described in more detail later below, after a description of method steps s72 and s74.

However, if, at step s70, it is determined that the third criterion (equation (14)) is not satisfied (i.e. it is determined instead that $$\Delta_f \sum_{m=1}^M s_{j,j}^m > P_T \Big),$$

then the method proceeds to step s72.

At step s72, the value of m that gives $$\min_m \log_2\left(1 + \frac{s_{j,j}^m \gamma_{j,j}^m}{\rho_{j,j}^m}\right)$$

is determined. This determined value of m is denoted m̂.

In other words, the tone m̂ that corresponds to the minimum signal-to-noise ratio (SNR) is determined.

At step s74, the power allocation factor corresponding to the determined tone m̂ is set equal to zero and/or the power allocated to the determined tone m̂ is set equal to zero. In other words $\rho_{j,j}^{\hat{m}}=0$ and/or $s_{j,j}^{\hat{m}}=0$.

After step s74, the method returns to step s70 whereat the third criterion (equation 14) is retested.

Returning now to the case where, at step s70, it is determined that the third criterion (equation (14)) is satisfied, then at step s76, each tone m (m-1, . . . , M) for the jth TMP/phantom channel is allocated its respective current power value $s_{j,j}^m$.

At step s78, the AN 16 transmits signals in accordance with power values allocated at step s76. For example, for each tone m, the AN 16 may transmit a signal having transmission power $s_{j,j}^m$ at tone m along the jth TMP/phantom channel.

As noted earlier above, the process shown in FIG. 5 and described in more detail above may be, in practice, performed for each of the different TMPs/phantom channels, j=1, . . . k. Thus, at step s78, for one or more of the tones m, and for one or more of the j TMPs and/or phantom channels, the AN 16 may transmit a signal having transmission power $s_{j,j}^m$ at tone m along the jth TMP/phantom channel. For example, at step s78, for each tone m (m=1, . . . , M), and for each TMP and/or phantom channel j (j=1, . . . , k), the AN 16 may transmit a signal having transmission power $s_{j,j}^m$ at tone m along the jth TMP/phantom channel.

Thus, a second example of a further bit and power allocation process is provided.

Advantageously, the method shown in FIG. 5 and described in more detail above tends to provide for rapid initialising of signal transmission between the AN 16 and the CPE modems 51, 52, 53. While in some cases, the signal powers determined using the process of FIG. 5 may be sub-optimal compared to those determined by the process shown in FIG. 3 and/or the process shown in FIG. 4, the process of FIG. 5 is nevertheless beneficial as it tends to be performable in relatively shorter time. Thus, the bit and power allocations determined using the process of FIG. 5 may be implemented in signal transmission while the process of FIG. 3 (and/or the process of FIG. 4) is being performed, to allow signal transmission between the AN 16 and the CPE modems 51, 52, 53 to begin earlier.

Furthermore, the method shown in FIG. 5 and described in more detail above tends to provide a solution for the objective function (equation (1)) in shorter time relative to conventional "water-filling" algorithms.

In the method shown in FIG. 5 and described in more detail above, bandwidth adjustment is performed to ensure that the ATP is satisfied, by gradually reducing the number of the allocated tones.

The above described methods and apparatus advantageously tend to provide fast converging "water filling" algorithms for performing equalisation on communication channels. Advantageously, the solutions provided by the above described algorithms tend to shape the transmitted signals according to the channel response to improve data transmission, e.g. to maximise the delivered data. Also, the above described methods and apparatus tend to take into account the maximum available power and the hardware limitations in transceiver design.

The above described methods and apparatus advantageously tend to provide improved use of power budget, and also match the power budget to channel behaviour.

Advantageously, it tends to be possible to tune the gap between the more optimal solution (provided by the process described above with reference to FIG. 3) and the relatively suboptimal solutions (provided by the processes described above with reference to FIGS. 4 and 5) to meet the a specified performance and to account for system complexity design Advantageously, it tends to be possible to implement the above described methods and apparatus for G.fast and XG.fast at all frequencies.

Advantageously, any complex functionality for implementing certain preferred embodiments of the invention can reside solely in the access network (e.g. at an AN or DSLAM, etc.) rather than requiring any special Customer Premises Equipment (CPE), in certain preferred embodiments of the invention.

It should be noted that certain of the process steps depicted in the flowcharts of FIGS. 3 to 5 and described above may be omitted or such process steps may be performed in differing order to that presented above and shown in FIGS. 3 to 5. Furthermore, although all the process steps have, for convenience and ease of understanding, been depicted as discrete temporally-sequential steps, nevertheless some of the process steps may in fact be performed simultaneously or at least overlapping to some extent temporally.

It should be noted that the described embodiments are couched in terms of the downstream direction of data only (i.e. from an Access Node/DSLAM to Customer Premises Equipment (CPE) devices). However, in a practical implementation the "transmitter" of the above embodiments (e.g. the Access Node) also, naturally, functions as a receiver for upstream transmissions from the various CPE devices (which are also therefore in practice operating as transceivers rather than just receivers). Embodiments of the invention may operate in an entirely conventional manner in the upstream direction.

In the above embodiments, the DPU is connected to three user premises via respective TMP connections which connect between the AN within the DPU and respective CPE modems within the respective user premises. However, in other embodiments, the DPU is connected to a different number of user premises (e.g. more than three) via respective one or more TMP connections. In some embodiments, the DPU is connected to a different number of CPE modems via respective one or more TMP connections. In some embodiments, one or more user premises comprises multiple CPE modems.

In the above embodiments, the first criterion is:

$$\log_2(1+s_{j,j}^m \gamma_{j,j}^m) > 0.$$

However, in other embodiments, the first criterion is a different criterion, or is an equivalent criterion expressed in a different way. By way of example, an alternative first criterion is:

$$\log_2(1+s_{j,j}^m \gamma_{j,j}^m) \geq \varepsilon_1$$

where $\varepsilon_1$ may be non zero. For example $\varepsilon_1$ may be a positive value, e.g. a small value such as less than or equal to $10^{-2}$, less than or equal to $10^{-3}$, or less than or equal to $10^{-4}$. In some embodiments, $\varepsilon_1$ is a constant value. In some embodiments, $\varepsilon_1$ is a variable that may be dependent on one or more parameters of the broadband deployment.

In the above embodiments, the second criterion is:

$$\log_2(1+s_{j,j}^m \gamma_{j,j}^m) \leq b_{max}$$

However, in other embodiments, the second criterion is a different criterion, or is an equivalent criterion expressed in a different way. By way of example, an alternative second criterion is:

$$\log_2(1+s_{j,j}^m \gamma_{j,j}^m) \leq b_{max} - \varepsilon_2$$

where $\varepsilon_2$ may be non zero. For example $\varepsilon_2$ may be a positive value, e.g. a small value such as less than or equal to $10^{-2}$, less than or equal to $10^{-3}$, or less than or equal to $10^{-4}$. In some embodiments, $\varepsilon_2$ is a constant value. In some embodiments, $\varepsilon_2$ is a variable that may be dependent on one or more parameters of the broadband deployment.

In the above embodiments, the third criterion is:

$$\Delta_f \sum_{m=1}^{M} s_{j,j}^m \leq P_T$$

However, in other embodiments, the third criterion is a different criterion, or is an equivalent criterion expressed in a different way. By way of example, an alternative third criterion is:

$$\Delta_f \sum_{m=1}^{M} s_{j,j}^m \leq P_T - \varepsilon_3$$

where $\varepsilon_3$ may be non zero. For example $\varepsilon_3$ may be a positive value, e.g. a small value such as less than or equal to $10^{-2}$, less than or equal to $10^{-3}$, or less than or equal to $10^{-4}$. In some embodiments, $\varepsilon_3$ is a constant value. In some embodiments, $\varepsilon_3$ is a variable that may be dependent on one or more parameters of the broadband deployment.

The invention claimed is:

1. A method of transmitting data from a transmitter device to one or more receiver devices, each of the one or more receiver devices being connected to the transmitter device via a respective wire connection, the transmitter device being configured to transmit signals onto the wire connections over one or more different channels, the method comprising:

iteratively performing steps (i) to (iii) until, at step (iii), it is determined that one or more criteria are satisfied, thereby determining, for each of the one or more different channels, a current respective transmission power for transmitting data over that channel, wherein:

step (i) comprises determining, for each of the one or more different channels, a value of a first function, the first function being a function of one or more parameters selected from the group of parameters consisting of: a number of different tones for the one or more different channels, a frequency spacing between adjacent tones, a maximum power for transmitting the data over the one or more different channels, and a channel gain of that channel;

step (ii) comprises, using the determined value of the first function, determining, for each of the one or more different channels, a respective one or more transmission power for transmitting the data along that channel; and step (iii) comprises determining whether or not the one or more determined transmission powers satisfy the one or more criteria; and thereafter, for each of the one or more different channels, transmitting, by the transmitter device, the data over that channel to the one or more receiver devices, the data being transmitted at the current transmission power determined for that channel;

wherein the first function is a Lagrange multiplier, the Lagrange multiplier being a term of a Lagrangian function, the Lagrangian function being dependent on a channel capacity of the one or more different channels and one or more constrains:

$$\sum_{m=1}^{M} s_{j,j}^m \leq P_T$$

$$\sum_{j} \rho_{j,j}^m \leq K, \forall m$$

$$s_{j,j}^m \leq p_m, \forall m$$

$$b_{min} \leq \rho_{j,j}^m \log_2\left(1 + \frac{s_{j,j}^m \gamma_{j,j}^m}{\rho_{j,j}^m}\right) \leq b_{max}$$

where $s_{j,j}^m$ is a power level for transmission on the $j^{th}$ channel and $m^{th}$ tone;

M is the number of different tones;

$P_T$ is the maximum transmitting power permitted for the one or more different channels;

$\rho_{j,j}^m$ is a binary allocation factor, where $\rho_{j,j}^m=1$ if transmission power is allocated to the $j^{th}$ channel for the $m^{th}$ tone, and $\rho_{j,j}^m=0$ if transmission power is not allocated to the $j^{th}$ channel for the $m^{th}$ tone;

K is the number of the one or more different channels;

$p_m$ is a transmission power mask for tone m;

$b_{min}$ is a lower bound for the channel capacity;

$\gamma_{j,j}^m$ is a gain of the $j^{th}$ channel; and $b_{max}$ is an upper bound for the channel capacity.

2. The method according to claim 1, wherein, for second and subsequent iterations of steps (i) to (iii), the first function is determined at step (i) by modifying a value of the first function of the preceding iteration.

3. The method according to claim 1, wherein:
an available spectrum for the transmission of the data over the one or more different channels comprises a plurality of tones;
steps (i) to (iii) are iterated for each of the plurality of the tones, thereby to determine, for each of the one or more different channels and for each of the plurality of tones, a current respective transmission power for transmitting data over that channel at that tone; and
the step of transmitting comprises, for each of the one or more different channels and for each of the plurality of tones, transmitting, by the transmitter device, the data over that channel and at that tone to the one or more receiver devices, the data being transmitted at the current transmission power determined for that channel and that tone.

4. The method according to claim 1, wherein:
an available spectrum for the transmission of the data over the one or more different channels comprises a plurality of tones; and
the first function is additionally a function of the one or more parameters selected from the group of parameters consisting of: a total number of different tones, and frequency separation between tones.

5. The method according to claim 1, wherein the first function is additionally a function of a gain of the one or more different channels, the gain of a channel being a ratio of a power coupling coefficient to a noise level on that channel.

6. The method according to claim 1, wherein:
an available spectrum for the transmission of the data over the one or more different channels comprises a plurality of tones; and
the first function is given by:

$$\Omega_{j,j} = \frac{M}{\ln 2 \left( \frac{P_T}{\Delta_f} + \sum_m \frac{1}{\gamma_{j,j}^m} \right)}$$

where: j is a channel index; and
$\Delta_f$ is the frequency spacing between adjacent tones.

7. The method according to claim 1, wherein:
step (ii) further comprises:
using the determined value of the first function, determining a value of a second function, the second function being a function of a power mask for transmitting the data over the one or more different channels; and
using the determined value of the second function, determining, for each of the one or more different channels, a respective transmission power for transmitting data along that channel.

8. The method according to claim 7, wherein the step of, using the determined value of the second function, determining, for each of the one or more different channels, the respective transmission power for transmitting the data along that channel comprises:
using the determined value of the second function, determining a value of a third function, the third function being a function of an upper bound for the channel capacity of the one or more different channels; and
using the determined value of the third function, determining, for each of the one or more different channels, a respective transmission power for transmitting data along that channel.

9. The method according to claim 8, wherein:
an available spectrum for the transmission of the data over the one or more different channels comprises a plurality of tones;
the second function is given by:

$$\eta_{j,j}^m = \frac{\gamma_{j,j}^m \left(1 - \beta_{max_{j,j}}^m \right)}{(\ln 2)(1 + p_m \gamma_{j,j}^m)} - \Omega_{j,j}$$

and the third function is given by:

$$\beta_{max_{j,j}}^m = 1 - \frac{2^{b_{max}} (\ln 2)(\Omega_{j,j} + \eta_{j,j}^m)}{\gamma_{j,j}^m}$$

where: j is a channel index;
m is an index for different tones;
$\beta_{max_{j,j}}^m$ is set to an initial value for determining the second function at a first iteration of the steps (i) and (iii);
$\gamma_{j,j}^m$ is a gain of the jth channel at tone m; and
$\Omega_{j,j}$ is the first function.

10. The method according to claim 1, wherein step (ii) further comprises:
using the determined value of the first function, determining, for each of the one or more different channels, an initial transmission power $s_{j,j}^m$ for that channel;
for each of the one or more different channels, determining whether the determined initial transmission power $s_{j,j}^m$ for that channel satisfies the criterion:

$\log_2(1 + s_{j,j}^m \gamma_{j,j}^m) > \varepsilon_1$

Where j is a channel index; and
$\varepsilon_1$ is a numerical value;
setting equal to zero each initial transmission power $s_{j,j}^m$ that does not satisfy the criterion $\log_2(1 + s_{j,j}^m \gamma_{j,j}^m) > \varepsilon_1$; and
maintaining the value of each initial transmission power $s_{j,j}^m$ that does satisfy the criterion $\log_2(1 + s_{j,j}^m \gamma_{j,j}^m) > \varepsilon_1$.

11. The method according to claim 10, wherein $\varepsilon_1$ is zero.

12. The method according to claim 1, wherein the one or more criteria comprise at least one criterion selected from the group of criteria consisting of:
the criterion that:

$\log_2(1 + s_{j,j}^m \gamma_{j,j}^m) \leq b_{max} - \varepsilon_2$, and the criterion that $$\sum_{m=1}^{M} s_{j,j}^m = P_T - \varepsilon_3;$$

wherein: j is a channel index; and
$\varepsilon_2$ and $\varepsilon_3$ are numerical values.

13. The method according to claim 12, wherein $\varepsilon_2$ and/or $\varepsilon_3$ are zero.

14. The method according to claim 1, wherein the one or more different channels comprise one or more channels selected from the group of channels consisting of: a direct channel, an indirect channel, a channel provided by a change over time of a potential difference between a pair of the wire connections, a phantom channel, and a common mode channel.

15. A computer program product stored on a non-transitory computer readable medium and comprising a program or a plurality of programs arranged such that when executed by a computer system or one or more processors it/they cause the computer system or the one or more processors to operate in accordance with the method of claim 1.

16. A non-transitory machine readable storage medium storing a program or a plurality of programs which upon execution by a computer system cause the computer system to perform the method according to claim 1.

17. A transmitter device for transmitting data to one or more receiver devices, each of which is connected to the transmitter device via a respective wire connection, the transmitter device being configured to transmit signals onto the wire connections over one or more different channels, the transmitter device being configured to:
iteratively perform steps (i) to (iii) until, at step (iii), it is determined that one or more criteria are satisfied, thereby to determine, for each of the one or more different channels, a current respective transmission power for transmitting data over that channel, wherein:
step (i) comprises determining, for each of the one or more different channels, a value of a first function, the first function being a function of one or more parameters selected from the group of parameters consisting of: a number of different tones for the one or more different channels, a frequency spacing between adjacent tones, a maximum power for transmitting the data over the one or more different channels, and a channel gain of that channel;
step (ii) comprises, using the determined value of the first function,
determining, for each of the one or more different channels, a respective one or more transmission powers for transmitting the data along that channel; and
step (iii) comprises determining whether or not the one or more determined transmission powers satisfy the one or more criteria; and
thereafter, for each of the one or more different channels, transmit, at the current transmission power determined for that channel, the data over that channel to the one or more receiver devices;
wherein the first function is a Lagrange multiplier, the Lagrange multiplier being a term of a Lagrangian function, the Lagrangian function being dependent on a channel capacity of the one or more different channels and one or more constraints;

$$\sum_{m=1}^{M} s_{j,j}^m \leq P_T$$

$$\sum_{j} \rho_{j,j}^m \leq K, \forall m$$

$$s_{j,j}^m \leq p_m, \forall m$$

$$b_{min} \leq \rho_{j,j}^m \log_2\left(1 + \frac{s_{j,j}^m \gamma_{j,j}^m}{\rho_{j,j}^m}\right) \leq b_{max}$$

where
$s_{j,j}^m$ is a power level for transmission on the $j^{th}$ channel and $m^{th}$ tone;

M is the number of different tones;
$P_T$ is the maximum transmitting power permitted for the one or more different channels;
$\gamma_{j,j}^m$ is a binary allocation factor, where $\gamma_{j,j}^m=1$ if transmission power is allocated to the $j^{th}$ channel for the $m^{th}$ tone, and $\gamma_{j,j}^m=0$ if transmission power is not allocated to the $j^{th}$ channel for the $m^{th}$ tone;
K is the number of one or more different channels;
$p_m$ is a transmission power mask for tone m;
$b_{min}$ is a lower bound for the channel capacity;
$\gamma_{j,j}^m$ is a gain of the $j^{th}$ channel; and
$b_{max}$ is an upper bound for the channel capacity.

18. A method of transmitting data from a transmitter device to one or more receiver devices, each of the one or more receiver devices being connected to the transmitter device via a respective wire connection, the transmitter device being configured to transmit signals onto the wire connections over one or more different channels, the method comprising:
iteratively performing steps (i) to (iii) until, at step (iii), it is determined that one or more criteria are satisfied, thereby determining, for each of the one or more different channels, a current respective transmission power for transmitting data over that channel, wherein:
step (i) comprises determining, for each of the one or more different channels, a value of a function, the function being a function of one or more parameters selected from the group of parameters consisting of: a number of different tones for the one or more different channels, a frequency spacing between adjacent tones, a maximum power for transmitting the data over the one or more different channels, and a channel gain of that channel;
step (ii) comprises, using the determined value of the function, determining, for each of the one or more different channels, a respective one or more transmission powers for transmitting the data along that channel; and
step (iii) comprises determining whether or not the one or more determined transmission powers satisfy the one or more criteria; and
thereafter, for each of the one or more different channels, transmitting, by the transmitter device, the data over that channel to the one or more receiver devices, the data being transmitted at the current transmission power determined for that channel;
an available spectrum for the transmission of the data over the one or more different channels comprises a plurality of tones; and
the function is given by:

$$\Omega_{j,j} = \frac{M}{\ln 2\left(\frac{P_T}{\Delta_f} + \sum_{m} \frac{1}{\gamma_{j,j}^m}\right)}$$

where: j is a channel index;
M is the number of different tones;
$\Delta_f$ is the frequency spacing between adjacent tones
$P_T$ is the maximum power for transmitting the data over the one or more different channels; and
$\gamma_{j,j}^m$ is a gain of the jth channel.

19. A method of transmitting data from a transmitter device to one or more receiver devices, each of the one or more receiver devices being connected to the transmitter device via a respective wire connection, the transmitter device being configured to transmit signals onto the wire connections over one or more different channels, the method comprising:

iteratively performing steps (i) to (iii) until, at step (iii), it is determined that one or more criteria are satisfied, thereby determining, for each of the one or more different channels, a current respective transmission power for transmitting data over that channel, wherein:

step (i) comprises determining, for each of the one or more different channels, a value of a function, the function being a function of one or more parameters selected from the group of parameters consisting of: a number of different tones for the one or more different channels, a frequency spacing between adjacent tones, a maximum power for transmitting the data over the one or more different channels, and a channel gain of that channel;

step (ii) comprises, using the determined value of the function, determining, for each of the one or more different channels, a respective one or more transmission powers for transmitting the data along that channel; and step (iii) comprises determining whether or not the one or more determined transmission powers satisfy the one or more criteria; and thereafter, for each of the one or more different channels, transmitting, by the transmitter device, the data over that channel to the one or more receiver devices, the data being transmitted at the current transmission power determined for that channel;

wherein step (ii) comprises:

using the determined value of the function, determining, for each of the one or more different channels, an initial transmission power $s_{j,j}^m$ for that channel;

for each of the one or more different channels, determining whether the determined initial transmission power $s_{j,j}^m$ for that channel satisfies the criterion:

$$\log_2(1+s_{j,j}^m \gamma_{j,j}^m) > \varepsilon_1$$

Where j is a channel index;

$\varepsilon_1$ is a numerical value; and $\gamma_{j,j}^m$ is a gain of the jth channel;

setting equal to zero each initial transmission power $s_{j,j}^m$ that does not satisfy the criterion $\log_2(1+s_{j,j}^m) > \varepsilon_1$; and maintaining the value of each initial transmission power $s_{j,j}^m$ that does satisfy the criterion $\log_2(1+s_{j,j}^m) > \varepsilon_1$.

20. The method according to claim 19, wherein $\varepsilon_1$ is zero.

21. A method of transmitting data from a transmitter device to one or more receiver devices, each of the one or more receiver devices being connected to the transmitter device via a respective wire connection, the transmitter device being configured to transmit signals onto the wire connections over one or more different channels, the method comprising:

iteratively performing steps (i) to (iii) until, at step (iii), it is determined that one or more criteria are satisfied, thereby determining, for each of the one or more different channels, a current respective transmission power for transmitting data over that channel, wherein:

step (i) comprises determining, for each of the one or more different channels, a value of a function, the function being a function of one or more parameters selected from the group of parameters consisting of: a number of different tones for the one or more different channels, a frequency spacing between adjacent tones, a maximum power for transmitting the data over the one or more different channels, and a channel gain of that channel;

step (ii) comprises, using the determined value of the function, determining, for each of the one or more different channels, a respective one or more transmission powers for transmitting the data along that channel; and step (iii) comprises determining whether or not the one or more determined transmission powers satisfy the one or more criteria; and thereafter, for each of the one or more different channels, transmitting, by the transmitter device, the data over that channel to the one or more receiver devices, the data being transmitted at the current transmission power determined for that channel;

the one or more criteria comprise at least one criterion selected from the group of criteria consisting of:

the criterion that:

$$\log_2(1+s_{j,j}^m) \leq b_{max} - \varepsilon_2,$$

and the criterion that $$\sum_{m=1}^{M} s_{j,j}^m = P_T - \varepsilon_3;$$

wherein: j is a channel index;

$s_{j,j}^m$ denotes the one or more determined transmission powers;

$\gamma_{j,j}^m$ is a gain of the jth channel;

$b_{max}$ is an upper bound for the channel capacity of the one or more channels;

$P_T$ is the maximum power for transmitting the data over the one or more different channels; and $\varepsilon_2$ and $\varepsilon_3$ are numerical values.

22. The method according to claim 21, wherein $\varepsilon_2$ and/or $\varepsilon_3$ are zero.

* * * * *